United States Patent
Imamura et al.

(10) Patent No.: US 10,535,367 B2
(45) Date of Patent: Jan. 14, 2020

(54) METAL OXIDE PARTICLE DISPERSION FOR MANUFACTURING PARTICULATE MAGNETIC RECORDING MEDIUM, METHOD OF MANUFACTURING MAGNETIC LAYER-FORMING COMPOSITION OF PARTICULATE MAGNETIC RECORDING MEDIUM AND METHOD OF MANUFACTURING PARTICULATE MAGNETIC RECORDING MEDIUM

(71) Applicant: FUJIFILM Corporation, Tokyo (JP)

(72) Inventors: Mika Imamura, Minami-ashigara (JP); Toshihide Aoshima, Minami-ashigara (JP); Isamu Watanabe, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 15/280,165

(22) Filed: Sep. 29, 2016

(65) Prior Publication Data

US 2017/0092316 A1    Mar. 30, 2017

(30) Foreign Application Priority Data

Sep. 30, 2015   (JP) ................................ 2015-195230

(51) Int. Cl.
| | |
|---|---|
| *G11B 5/842* | (2006.01) |
| *G11B 5/702* | (2006.01) |
| *G11B 5/706* | (2006.01) |
| *G11B 5/70* | (2006.01) |
| *H01F 1/44* | (2006.01) |
| *H01F 1/03* | (2006.01) |

(52) U.S. Cl.
CPC ............ *G11B 5/842* (2013.01); *G11B 5/7013* (2013.01); *G11B 5/7021* (2013.01); *G11B 5/70605* (2013.01); *H01F 1/0315* (2013.01); *H01F 1/445* (2013.01)

(58) Field of Classification Search
None
See application file for complete search history.

(56) References Cited

U.S. PATENT DOCUMENTS

| | | | |
|---|---|---|---|
| 5,470,645 A | 11/1995 | Oguchi et al. | |
| 2011/0003241 A1* | 1/2011 | Kaneko | C08G 73/0206 430/7 |
| 2013/0130064 A1* | 5/2013 | Sato | H01F 41/16 428/837 |
| 2014/0374645 A1 | 12/2014 | Kikuchi et al. | |

FOREIGN PATENT DOCUMENTS

| | | |
|---|---|---|
| JP | 5135353 A | 6/1993 |
| JP | 8-287462 A | 11/1996 |
| JP | 10-330655 A | 12/1998 |
| JP | 2013-131285 A | 7/2013 |
| JP | 2015-28830 A | 2/2015 |

OTHER PUBLICATIONS

Office Action dated Mar. 13, 2018, from the Japanese Patent Office in counterpart Japanese Application No. 2015-195230.

* cited by examiner

*Primary Examiner* — Christopher M Rodd
(74) *Attorney, Agent, or Firm* — Sughrue Mion, PLLC

(57) ABSTRACT

The metal oxide particle dispersion for manufacturing a particulate magnetic recording medium contains metal oxide particles, solvent, and a polyester compound having one or more groups selected from the group consisting of a carboxyl group and a salt thereof, a phosphoric acid group and a salt thereof, a hydroxyl group and a nitrogen-substituted alkylene group, but substantially not containing ferromagnetic powder.

16 Claims, No Drawings

METAL OXIDE PARTICLE DISPERSION FOR MANUFACTURING PARTICULATE MAGNETIC RECORDING MEDIUM, METHOD OF MANUFACTURING MAGNETIC LAYER-FORMING COMPOSITION OF PARTICULATE MAGNETIC RECORDING MEDIUM AND METHOD OF MANUFACTURING PARTICULATE MAGNETIC RECORDING MEDIUM

CROSS-REFERENCE TO RELATED APPLICATIONS

This application claims priority under 35 U.S.C 119 to Japanese Patent Application No. 2015-195230 filed on Sep. 30, 2015. The above application is hereby expressly incorporated by reference, in its entirety.

BACKGROUND OF THE INVENTION

Field of the Invention

The present invention relates to a metal oxide particle dispersion for manufacturing a particulate magnetic recording medium, a method of manufacturing a magnetic layer-forming composition of a particulate magnetic recording medium and a method of manufacturing a particulate magnetic recording medium.

Discussion of the Background

Magnetic recording media come in the forms of particulate magnetic recording media, which have a magnetic layer fabricated by coating a magnetic layer-forming composition—containing ferromagnetic powder and binder dispersed in solvent—on a nonmagnetic support, and magnetic recording media of the thin metal film type, in which ferromagnetic powder is deposited on a nonmagnetic support to form a film. From the perspectives of productivity and general versatility, particulate magnetic recording media are known to be superior. Hereinafter, unless specifically stated otherwise, the term "magnetic recording medium" will be used to refer to particulate magnetic recording media.

In a particulate magnetic recording medium, metal oxide particles, which are a type of nonmagnetic powder, are often employed as a component of the magnetic layer (for example, see Japanese Unexamined Patent Publication (KOKAI) No. 2013-131285 or English language family member US2013/130064A1, which are expressly incorporated herein by reference in their entirety). By causing metal oxide particles to suitably protrude from the surface of the magnetic layer, abrasiveness that removes foreign material (head deposits) that have adhered to the magnetic head can be imparted to the surface of the magnetic layer, the coefficient of friction during sliding of (contact between) the surface of the magnetic layer and the magnetic head can be reduced, and running stability can be enhanced.

SUMMARY OF THE INVENTION

When metal oxide particles employed to reduce the coefficient of friction and/or impart abrasiveness to the surface of the magnetic layer are present in the state of a coarse aggregate in the magnetic layer, the surface of the magnetic layer roughens, presenting the possibility of causing signal loss, wear and tear, and the like in the course of reproducing signals that have been recorded on the magnetic recording medium. Accordingly, it is desirable to inhibit the aggregation of metal oxide particles in the magnetic layer.

In recent years, to inhibit the aggregation of metal oxide particles in the magnetic layer, it has been proposed that a metal oxide particle dispersion that is prepared by mixing and dispersing metal oxide particles separately from the ferromagnetic powder be mixed with a dispersion obtained by mixing and dispersing ferromagnetic powder with solvent (referred to as a "magnetic liquid") (by so-called separate dispersion), to prepare a magnetic layer-forming composition. For example, Japanese Unexamined Patent Publication (KOKAI) No. 2013-131285 discloses an example of such a metal oxide particle dispersion in the form of an alumina dispersion. Japanese Unexamined Patent Publication (KOKAI) No. 2013-131285 states that the dispersion of alumina is enhanced in the dispersion by incorporating an aromatic hydrocarbon compound having a phenolic hydroxyl group into the alumina dispersion.

Enhancing the dispersion of metal oxide particles in a metal oxide particle dispersion is desirable because it relates to inhibiting the aggregation of metal oxide particles in the magnetic layer that is formed using the magnetic layer-forming composition prepared by mixing the dispersion with a magnetic liquid Inhibiting aggregation of the metal oxide particles can increase the smoothness of the surface of the magnetic layer. However, the present inventors have come to presume that it is desirable to inhibit change in the surface state of the magnetic layer with repeated running in order to provide a magnetic recording medium capable of achieving even better performance. If the change in the surface state of the magnetic layer can be inhibited, even with repeated running, it becomes possible to remove head deposits by maintaining good abrasiveness on the surface of the magnetic layer, and maintain good running stability (a low coefficient of friction).

An aspect of the present invention provides for a metal oxide particle dispersion for manufacturing a particulate magnetic recording medium, permitting the manufacturing of a particulate magnetic recording medium affording good dispersion of metal oxide particles and inhibiting change in the surface state of the magnetic layer due to sliding of the surface of the magnetic layer and the head.

An aspect of the present invention relates to:

a metal oxide particle dispersion for manufacturing a particulate magnetic recording medium (also referred to hereinafter simply as a "metal oxide particle dispersion" or "dispersion") containing:

metal oxide particles;

solvent; and a polyester compound having one or more groups selected from the group consisting of a carboxyl group and a salt thereof, a phosphoric acid group and a salt thereof, a hydroxyl group and a nitrogen-substituted alkylene group, but substantially not containing ferromagnetic powder.

More particularly, the fact that metal oxide particles could be well dispersed in the above dispersion, and the fact that change in the surface state of the magnetic layer with repeated running could be inhibited (specifically, change in the surface roughness and/or coefficient of friction of the magnetic layer) with a magnetic recording medium having a magnetic layer formed with the magnetic layer-forming composition fabricated by mixing the dispersion and ferromagnetic particles were discovered as a result of extensive research by the present inventors. The presumptions of the present inventors in this regard will be described further below.

In the present invention and present specification, the statement that the above dispersion "does not substantially contain ferromagnetic powder" means that none is added as a constituent component of the dispersion, and that the presence of trace amounts of impurities in the form of ferromagnetic powder that has been unintentionally mixed in is permissible. For example, the magnetic layer-forming composition will commonly contain more ferromagnetic powder than metal oxide particles. The above dispersion is not such a magnetic layer-forming composition. The above dispersion can be admixed with ferromagnetic powder for use in preparing a magnetic layer-forming composition.

In the present invention and present specification, the term "salt of a carboxyl group (—COOH)" is a salt denoted by —COO$^-$M$^+$. The "salt of a phosphoric acid group (—P=O(OH)$_2$)" is a salt denoted by —P=O(O$^-$M$^+$)$_2$. The above M$^+$ denotes a cation such as an alkali metal ion and the like. Hereinafter, the term "carboxyl (salt) group" is employed with a meaning that includes a carboxyl group and a salt thereof. The same applies to "phosphoric acid (salt) group".

The term "nitrogen-substituted alkylene group" refers to a structure in which one or more of the carbon atoms constituting the main chain of an alkylene group have been replaced with nitrogen atom(s). Specific examples are the partial structures denoted by formulas A and B further below produced by opening the ring of an alkyleneimine.

In one embodiment, the polyester compound contains one or more groups selected from the group consisting of a carboxyl group and a salt thereof, a phosphoric acid group and a salt thereof, and a nitrogen-substituted alkylene group.

In one embodiment, the weight average molecular weight of the polyester compound is greater than or equal to 1,000 but less than or equal to 20,000. In the present invention and present specification, the term "weight average molecular weight" refers to the weight average molecular weight as measured by gel permeation chromatography (GPC) and converted to a polystyrene equivalent. An example of specific measurement conditions will be given further below.

In one embodiment, the weight average molecular weight of the polyester compound is greater than or equal to 1,000 but less than or equal to 10,000.

In one embodiment, the polyester compound includes a polyester compound having a nitrogen-substituted alkylene group, with the polyester compound having a nitrogen-substituted alkylene group being a polyalkyleneimine compound. The term "polyalkyleneimine compound" refers to a compound containing two or more partial structures produced by opening the ring of an alkyleneimine. The above polyester compound is such a polyalkyleneimine compound. Hereinafter, compounds that are both polyester compounds and polyalkyleneimine compounds will be referred to as polyalkyleneimine-polyester compounds. The details will be provided further below.

In one embodiment, the polyester compound includes the polyester compound denoted by formula (1) below.

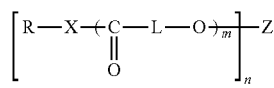

Formula (1)

(In formula (1), X denotes —O—, —S—, or —NR$^{100}$—. Each of R and R$^{100}$ independently denotes a hydrogen atom or a monovalent substituent. L denotes a divalent linking group. Z denotes a partial structure of valance n having at least one group selected from the group consisting of a carboxyl group and a salt thereof. m denotes an integer of greater than or equal to 2, and n denotes an integer of greater than or equal to 1.)

In one embodiment, Z in formula (1) denotes a reactive residue of a carboxylic anhydride. The carboxylic anhydride is a compound having a partial structure denoted by —(C=O)—O—(C=O)—. In the carboxylic anhydride, the above partial structure is a reactive moiety. Z and the oxygen atom in the —((C=O)-L-O)m- in formula (1) are bonded through a carbonyl bond —(C=O)—), producing a carboxyl (salt) group. The partial structure thus produced is a reactive residue of carboxylic anhydride. In one embodiment, this carboxylic anhydride is tetracarboxylic anhydride. Details will be provided further below.

In one embodiment, the above metal oxide particles are at least one type of metal oxide particles selected from the groups consisting of alumina particles, titanium oxide particles, zinc oxide particles and zirconia particles.

In one embodiment, the average particle size of the metal oxide particles falls within a range of 25 nm to 200 nm.

In one embodiment, the above solvent contains organic solvent.

In one embodiment, the above solvent contains ketone solvent.

In one embodiment, the above dispersion further contains binder. In the present invention and present specification, the term "binder" refers to one or more resins. The term "resin" refers to polymer having two or more identical or different repeating units, and can be homopolymer or copolymer. Details regarding the binder will be provided further below.

In one embodiment, the binder includes at least one resin selected from the group consisting of polyurethane resin and vinyl chloride resin.

In one embodiment, the dispersion is employed in the preparation of the magnetic layer-forming composition of a particulate magnetic recording medium.

In one embodiment, the dispersion contains 1.0 to 50.0 weight parts of the polyester compound per 100.0 weight parts of metal oxide particles.

A further aspect of the present invention relates to a method of manufacturing a magnetic layer-forming composition of a particulate magnetic recording medium including mixing the above dispersion with ferromagnetic powder.

In the present invention and present specification, the term "ferromagnetic powder" means a collection of multiple ferromagnetic particles. The term "collection" is not limited to a form in which the constituent particles are in direct contact, but includes forms in which the binder, additives, and the like described further below are present between the particles. The term "particles" is also sometimes used to denote powder. The above is also applied to the various powders, such as nonmagnetic powder, in the present invention and present specification.

In one embodiment, the above mixing is conducted by mixing the above dispersion with a magnetic liquid containing the above ferromagnetic powder, solvent, and binder.

A further aspect of the present invention relates to a method of manufacturing a particulate magnetic recording medium, including manufacturing a magnetic layer-forming composition by the above manufacturing method, and forming a magnetic layer through coating the magnetic layer-forming composition that has been manufactured on a nonmagnetic support.

A further embodiment of the present invention relates to a particulate magnetic recording medium that is manufactured by the above manufacturing method. This particulate magnetic recording medium is a magnetic recording medium having a magnetic layer formed using the dispersion that has been discovered by the present inventors and having novel characteristics and/or a novel structure not found in conventional magnetic recording media, making it possible to inhibit changes in the surface state of the magnetic layer with repeated running.

An aspect of the present invention can provide a metal oxide particle dispersion in which metal oxide particles are well dispersed, as well as providing a magnetic recording medium in which change in the surface state of the magnetic layer due to sliding between surface of the magnetic layer and the magnetic head during running is inhibited by forming a magnetic layer with this dispersion.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the multiple reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Metal Oxide Particle Dispersion for Manufacturing Particulate Magnetic Recording Medium The metal oxide particle dispersion for manufacturing a particulate magnetic recording medium according to an aspect of the present invention contains metal oxide particles, solvent and a polyester compound having one or more groups selected from the group consisting of a carboxyl group and a salt thereof, a phosphoric acid group and a salt thereof, a hydroxyl group and a nitrogen-substituted alkylene group, but, as set forth above, substantially not containing ferromagnetic powder.

The above dispersion can be suitably used to prepare a magnetic layer-forming composition of a particulate magnetic recording medium. More particularly, the above dispersion can be mixed with ferromagnetic powder to prepare a magnetic layer-forming composition. Details will be provided further below.

The present inventors presume the following with regard to the above dispersion.

The polyester compound that is contained in the above dispersion contains at least one group selected from the group consisting of a carboxyl (salt) group, a phosphoric acid (salt) group, a hydroxyl group, and a nitrogen-substituted alkylene group. The above group is a group having polarity (a polar group) that is thought to have great affinity with the surface of the metal oxide particles. Thus, the above group can be presumed to function as an adsorbing moiety that adsorbs to the surface of the metal oxide particles in solvent. This adsorbing moiety is thought to cause the polyester compound to adsorb to the surface of the metal oxide particles. The present inventors presume that the polymer chains (referred to as the "polyester chains" hereinafter) containing multiple ester bonds of the polyester compound can spread out over the surface of the particle, inhibiting direct contact and aggregation of the metal oxide particles, thereby enhancing the dispersion of the metal oxide particles.

The present inventors presume that change in the surface state of the magnetic layer with repeated running (specifically, change in the surface roughness of the magnetic layer and/or in the coefficient of friction) is caused by metal oxide particles suitably protruding from the surface of the magnetic layer being pressed into the magnetic layer by the magnetic head in the course of the surface of the magnetic layer sliding against the head during running. By contrast, the present inventors presume that in the magnetic layer that is formed with the above dispersion, the polyester chains of the polyester compound that has adsorbed to the surface of the metal oxide particles are thought to entangle with the polymer chains of the binder, thereby making it difficult for the metal oxide particles to move within the magnetic layer. The present inventors presume that this fact can contribute to inhibiting the metal oxide particles from being pressed into the magnetic layer by the magnetic head, thus inhibiting change in the surface state of the magnetic layer with repeated running (specifically, change in the surface roughness of the magnetic layer and/or in the coefficient of friction).

However, these are merely presumptions of the present inventors and are not intended to limit the present invention in any way.

The above dispersion will be described in greater detail below.

<Metal Oxide Particles>

Examples of metal oxide particles are alumina particles, titanium oxide particles, zinc oxide particles, zirconia (zirconium oxide) particles, chromium oxide particles, cerium oxide particles, α-iron oxide particles, corundum particles, tin oxide particles, magnesium oxide particles, and tungsten oxide particles. Alumina particles, titanium oxide particles, zinc oxide particles, and zirconia (zirconium oxide) particles are desirable. The alumina constituting the alumina particles can be α-alumina (desirably α-alumina with an α conversion rate of greater than or equal to 50%), β-alumina, γ-alumina, θ-alumina, or the like.

The average particle size can be used as an indicator of the particle size of the above metal oxide particles. The average particle size desirably falls within a range of 25 nm to 200 nm, preferably within a range of 60 nm to 150 nm.

The average particle size of the metal oxide particles is a value that is measured by the following method with observation of powder of metal oxide particles (metal oxide powder) using a transmission electron microscope.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the metal oxide powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder is the average particle size as obtained by the above method unless specifically stated otherwise. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder from a magnetic layer for particle size measurement.

In the present invention and present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The metal oxide particles described above are available as commercial products, and can also be manufactured by known methods.

<Solvent>

The solvent contained in the above dispersion is not specifically limited. From the perspective of the solubility of the polyester compound contained in the dispersion, an organic solvent is desirably incorporated. The content of the organic solvent relative to the total quantity of solvent is desirably greater than or equal to 80 weight % or greater than or equal to 90 weight %, with 100 weight % organic solvent also being possible. A single type of solvent can be employed or two or more can be combined for use. When employing two or more solvents, the content refers to the combined quantity of the two or more solvents. In the present invention and present specification, a single type of a given component can be employed, or two or more types can be combined for use. The content when two or more types are combined for use refers to the combined quantity of these components.

Examples of organic solvents are the various organic solvents that are used in the manufacturing of particulate magnetic recording media. Specific examples are the various organic solvents described further below as organic solvents incorporated in the preparation of the magnetic liquid. Of these, the ketone solvents that are widely employed in the manufacturing of particulate magnetic recording media are desirable. Specific examples of ketone solvents are acetone, methyl ethyl ketone, methyl isobutyl ketone, and cyclohexanone. The content of the ketone solvent relative to the total quantity of solvent is desirably greater than or equal to 85 weight %, preferably greater than or equal to 90 weight %. The content of the ketone solvent relative to the entire quantity of solvent is, for example, less than or equal to 98 weight %, with 100 weight % ketone solvent also being possible. Examples of organic solvents other than ketone solvents are methanol, ethanol, isopropanol, toluene, xylene, ethylbenzene, ethyl formate, ethyl acetate, butyl acetate, dioxane, tetrahydrofuran, and dimethylformamide. The above dispersion can be prepared by substituting one or more of these for ketone solvents, or combining these with ketone solvents as the solvent.

<Polyester Compound>

The above dispersion contains metal oxide particles and solvent, and further contains a polyester compound containing at least one group selected from the group consisting of a carboxyl (salt) group, phosphoric acid (salt) group, hydroxyl group, and nitrogen-substituted alkylene group. The polyester group is polymer containing a polyester chain (a polymer chain containing multiple ester bonds), and contains the above group together with a polyester chain. The presumptions of the present inventors with regard to the effect of the polyester compound are as set forth above.

The polyester compound contains at least one group selected from the group consisting of a carboxyl (salt) group, phosphoric acid (salt) group, hydroxyl group, and nitrogen-substituted alkylene group; desirably contains at least one group selected from the group consisting of a carboxyl (salt) group, phosphoric acid (salt) group, and nitrogen-substituted alkylene group; and preferably contains at least one group selected from the group consisting of a carboxyl (salt) group and a nitrogen-substituted alkylene group.

<<Weight Average Molecular Weight>>

The polyester compound need only contain the above group and polyester chain. The weight average molecular weight thereof is not limited. From the perspective of more effectively inhibiting the metal oxide particles from sinking into the interior of the magnetic layer with repeated running, the present inventors presume that the weight average molecular weight of the polyester compound is desirably lower than that of the binders generally employed in the magnetic layer. For this reason, the weight average molecular weight of the polyester compound is desirably greater than or equal to 1,000 but less than or equal to 20,000. The weight average molecular weight of the polyester compound is preferably less than or equal to 12,000, and more preferably, less than or equal to 10,000. The weight average molecular weight of the compound denoted by formula (1) is, for example, greater than or equal to 1,000, desirably greater than or equal to 1,500, and preferably, greater than or equal to 2,000. The weight average molecular weight of a mixture of two or more structural isomers refers to the weight average molecular weight of two or more structural isomers contained in the mixture.

Examples of desirable forms of the above polyester compound are the compound denoted by formula (1), described further below, and polyalkyleneimine-polyester compounds. However, the polyester compound is not limited to the forms set forth below.

<<Polyester Compound Denoted by Formula (1)>>

The compound denoted by formula (1) is an example of a specific form of the polyester compound. Hereinafter, unless specifically stated otherwise, the groups described can be substituted or unsubstituted. When a given group contains a substituent, examples of the substituent are an alkyl group (such as an alkyl group with 1 to 6 carbon atoms), hydroxy group, alkoxy group (such as an alkoxy group with 1 to 6 carbon atoms), halogen atom (for example, a fluorine atom, chlorine atom, or bromine atom), cyano group, amino group, nitro group, acyl group, or carboxy (salt) group). For a group containing a substituent, the "number of carbon atoms" means the number of carbon atoms of the portion without the substituent.

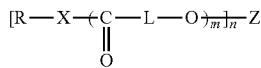

Formula (1)

(In formula (1), X denotes —O—, —S—, or —NR$^{100}$—. Each of R and R$^{100}$ independently denotes a hydrogen atom or a monovalent substituent. L denotes a divalent linking group. Z denotes a partial structure of valence n having at least one group selected from the group consisting of a carboxyl group and a salt thereof (carboxyl (salt) group). m denotes an integer of greater than or equal to 2, and n denotes an integer of greater than or equal to 1.)

In Formula (1), there are m×n instances of L. There are also n instances of each of R and X. When L is present in a plurality of number in Formula (1), the plurality of L can be identical or different. The same applies to R and X.

In Formula (1), X denotes —O—, —S—, or NR$^{100}$— and R$^{100}$ denotes a hydrogen atom or a monovalent substituent. Examples of the monovalent substituents are the above substituents. An alkyl group is desirable, an alkyl group with 1 to 6 carbon atoms is preferred, and a methyl or an ethyl group is of greater preference. Even more preferably, R$^{100}$ denotes a hydrogen atom. X desirably denotes —O—.

R denotes a hydrogen atom or a monovalent substituent. R desirably denotes a monovalent substituent. Examples of monovalent substituents denoted by R are linear and branched alkyl groups, aryl groups, heteroaryl groups, alicyclic groups, and non-aromatic heterocyclic groups, as well as structures in which a divalent linking group is linked to these monovalent groups. Examples of the divalent linking group are divalent linking groups comprised of one, or a combination of two or more, members selected from the group consisting of —C(=O)—O—, —O—, —C(=O)—NR$^{101}$— (where R$^{101}$ denotes a hydrogen atom or an alkyl group having 1 to 4 carbon atoms), —O—C(=O)—NH—, phenylene groups, alkylene groups having 1 to 30 carbon atoms, and alkenylene groups having 2 to 30 carbon atoms. The following structures and the structures included in the R moiety of the compounds denoted by formula (1) employed in Examples described further below are specific examples of monovalent substituents denoted by R. In the following structures, "*" denotes the position of the bond with X. However, the present invention is not limited to the specific examples given below.

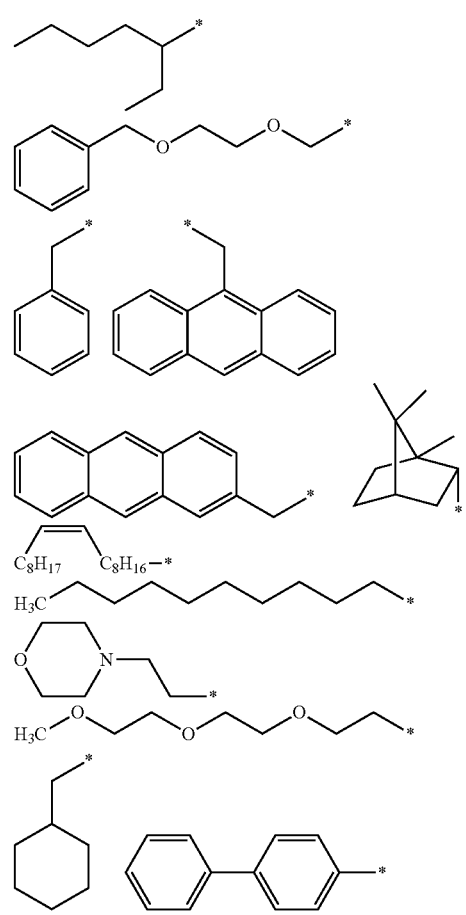

In Formula (1), L denotes a divalent linking group. Examples of divalent linking groups are divalent linking groups comprised of one, or a combination of two or more, members selected from the group consisting of linear, branched, and cyclic alkylene groups; linear, branched, and cyclic alkenylene groups; —C(=O)—; —O—; arylene groups; and halogen atoms. More specific examples are divalent linking groups comprised of one, or a combination of two or more, members selected from the among linear, branched, and cyclic alkylene groups with 1 to 12 carbon atoms; linear, branched, and cyclic alkenylene groups having 1 to 6 carbon atoms; —C(=O)—, —O—, phenylene groups, and halogen atoms. The above divalent linking group desirably comprises 1 to 10 carbon atoms, 0 to 10 oxygen atoms, 0 to 10 halogen atoms, and 1 to 30 hydrogen atoms. Specific examples are alkylene groups and the structures given below. In the structures given below, "*" denotes the position of a bond with another structure. However, the present invention is not limited to the following specific examples.

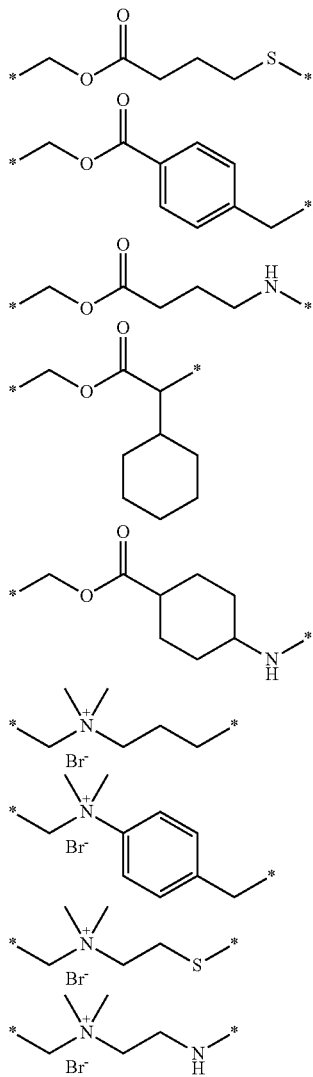

L desirably denotes an alkylene group, preferably denotes an alkylene group with 1 to 12 carbon atoms, more preferably denotes an alkylene group with 1 to 5 carbon atoms, and still more preferably, denotes an unsubstituted alkylene group with 1 to 5 carbon atoms.

Z denotes a partial structure of valence n having at least one group (carboxyl (salt) group) selected from the group consisting of a carboxyl group and a salt thereof groups.

At least one, desirably 2 or more, and preferably, 2 to 4, carboxyl (salt) groups are contained per instance of Z.

Z can contain one or more linear, branched, or cyclic structures. From the perspective of ease of synthesis, Z is desirably a reactive residue of a carboxylic acid anhydride. Specific examples are the following structures. In the following structures, "*" denotes the site of a bond with another structure. However, the present invention is not limited to the following specific examples.

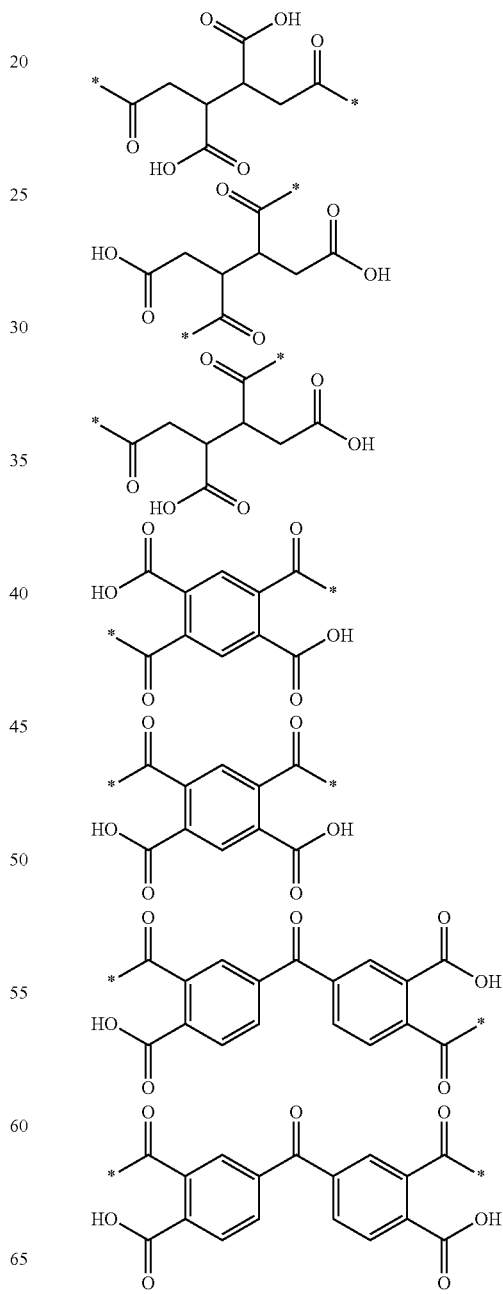

-continued

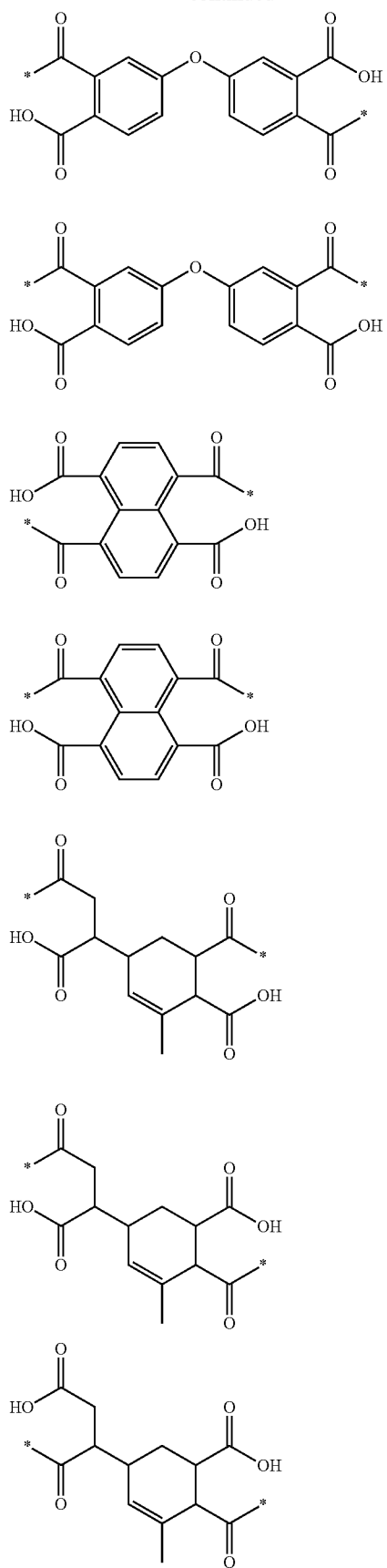

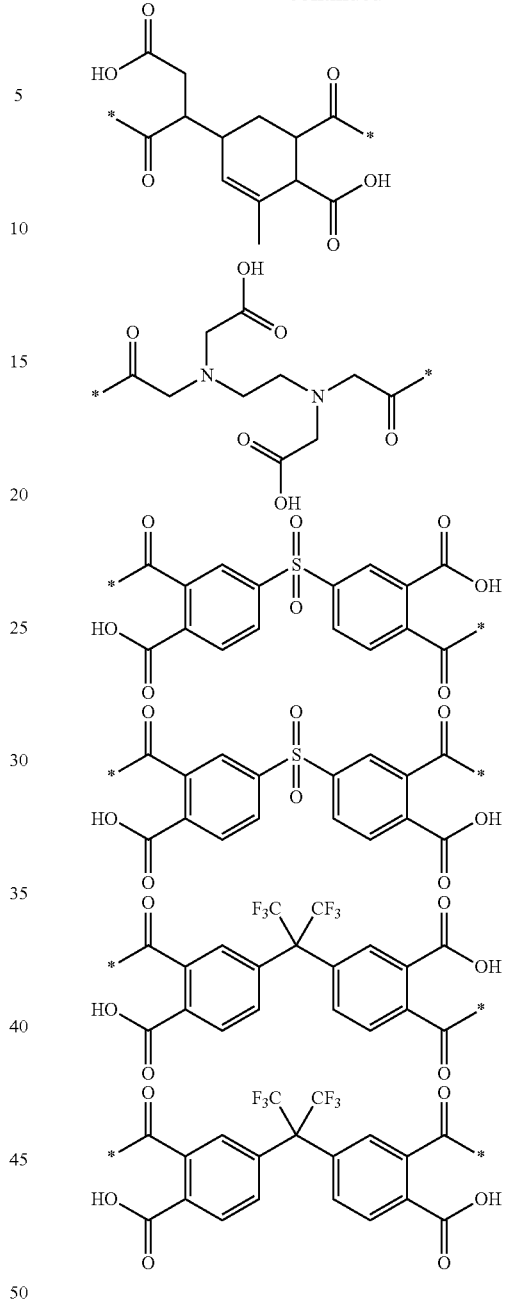

Synthesizing the compound denoted by Formula (1) using a carboxylic acid anhydride having at least one of the above-described —(C=O)—O—(C=O)— partial structures makes it possible to obtain a compound denoted by Formula (1) having the reactive residue in the form of a monovalent reactive residue. Using a compound having two such partial structures makes it possible to obtain a compound denoted by Formula (1) having the reactive residue in the form of a divalent reactive residue. The same applies to a compound denoted by Formula (1) having a trivalent or higher reactive residue. As set forth above, n denotes an integer that is greater than or equal to 1; for example, an integer falling within a range of 1 to 4, desirably an integer falling within a range of 2 to 4.

By way of example, employing a tetracarboxylic acid anhydride as the carboxylic acid anhydride makes it possible to obtain a compound denoted by Formula (1) in which n=2. The term "tetracarboxylic acid anhydride" refers to a compound having four carboxyl groups per molecule in which two of the above partial structures are imparted to each molecule by the dehydration condensation of pairs of carboxyl groups. In Formula (1), a compound in which Z denotes the reactive residue of a tetracarboxylic acid anhydride is desirable from the perspective of further enhancing the dispersion of the metal oxide particles. Examples of tetracarboxylic acid anhydrides are various tetracarboxylic acid anhydrides such as aliphatic tetracarboxylic acid anhydrides, aromatic tetracarboxylic acid anhydrides, and polycyclic tetracarboxylic acid anhydrides.

Examples of aliphatic tetracarboxylic acid anhydrides are meso-butane-1,2,3,4-tetracarboxylic acid dianhydride, 1,2,3,4-cyclobutane tetracarboxylic acid dianhydride, 1,3-dimethyl-1,2,3,4-cyclobutane tetracarboxylic acid dianhydride, 1,2,3,4-cyclopentane tetracarboxylic acid dianhydride, 2,3,5-tricarboxycyclopentylacetic acid dianhydride, 2,3,5,6-tetracarboxycyclohexane dianhydride, 2,3,5,6-tetracarboxynorbornane dianhydride, 3,5,6-tricarboxynobornane-2-acetic acid dianhydride, 2,3,4,5-tetrahydrofurantetracarboxylic acid dianhydride, 5-(2,5-dioxotetrahydrofuryl)-3-methyl-3-cyclohexene-1,2-dicarboxylic acid dianhydride, bicyclo[2,2,2]-octo-7-ene-2,3,5,6-tetracarboxylic acid dianhydride, and ethylene diamine tetraacetic acid dianhydride.

Examples of aromatic tetracarboxylic acid anhydrides are pyromellitic acid dianhydride, ethylene glycol dianhydrous trimellitic acid ester, propylene glycol dianhydrous trimellitic acid ester, butylene glycol dianhydrous trimellitic acid ester, 3,3',4,4'-benzophenonetetracarboxlic acid dianhydride, 2,2',3,3'-benzophenonetetracarboxylic acid dianhydride, 3,3',4,4'-biphenylsulfonetetracarboxylic acid dianhydride, 2,2',3,3'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilane tetracarboxylic acid dianhydride, 3,3',4,4'-tetraphenylsilane tetracarboxylic acid dianhydride, 1,2,3,4-furanetetracarboxylic acid dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic acid dianhydride, 3,3',4,4'-biphenyltetracarboxylic acid dianhydride, bis(phthalic acid)phenylphosphineoxide dianhydride, p-phenylene-bis(triphenylphthalic acid) dianhydride, M-phenylene-bis(triphenylphthalic acid) dianhydride, bis(triphenylphthalic acid)-4,4'-diphenyl ether dianhydride, bis(triphenylphthalic acid)-4,4'-diphenylmethane dianhydride, 9,9-bis(3,4-dicarboxyphenyl)fluorene dianhydride, and 9,9-bis[4-(3,4-dicarboxyphenoxy)phenyl]fluorene dianhydride.

Examples of polycyclic tetracarboxylic acid anhydrides are 3,4-dicarboxy-1,2,3,4-tetrahydro-1-naphthalenesuccinic acid dianhydride and 3,4-dicarboxy-1,2,3,4-tetrahydro-6-methyl-1-naphthalenesuccinic acid dianhydride.

In formula (1), m denotes an integer of greater than or equal to 2. The compound denoted by formula (1) is a compound containing a polyester chain. The incorporation of a polyester chain is thought to inhibit change in the surface state of the magnetic layer with repeated running and enhance the dispersion of the metal oxide particles. From these perspectives, m is desirably an integer falling within a range of 5 to 200, preferably an integer falling within a range of 5 to 100, and more preferably, an integer falling within a range of 5 to 60.

The various compounds indicated in Examples further below are specific examples of the above compound.

(Synthesis Method)

The compound denoted by Formula (1) that has been described above can be synthesized by known methods. An example of a synthesis method is a method where a carboxylic acid anhydride and the compound denoted by Formula (2) below are subjected to a ring-opening addition reaction or the like. In Formula (2), each of R, X, L, and m are defined as in Formula (1). A denotes a hydrogen atom, alkali metal atom, or quaternary ammonium base, desirably a hydrogen atom.

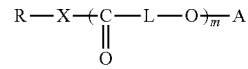

Formula (2)

In the reaction of carboxylic acid anhydride and the compound denoted by Formula (2), when conducted with butane tetracarboxylic acid anhydride, the butane tetracarboxylic acid anhydride is mixed in a proportion of 0.4 mol to 0.5 mol per equivalent of hydroxyl groups. The reaction is conducted for about 3 hours to 12 hours with heating and stirring without solvent, or with an organic solvent with a boiling point of 50° C. or higher as needed, and in the presence of a reaction catalyst such as a tertiary amine or inorganic base. Even when employing some other carboxylic acid anhydride, the reaction between the carboxylic acid anhydride and the compound denoted by Formula (2) can be implemented according to the above reaction conditions or according to known reaction conditions.

Subsequent steps such as purification can be implemented as needed following the above reaction.

The compound denoted by Formula (2) that is employed can be a commercial product or can be obtained by a known polyester synthesis method. An example of a polyester synthesis method is lactone ring-opening polymerization. Examples of the lactone are ε-caprolactone, δ-caprolactone, β-propiolactone, γ-butyrolactone, δ-valerolactone, γ-valerolactone, enantolactone, β-butyrolactone, γ-hexanolactone, γ-octanolactone, δ-hexanolactone, δ-octanolactone, δ-dodecanolactone, α-butyl-γ-butyolactone, and lactides. The lactide can be L-form or D-form. In polyester synthesis, one type of lactone can be employed, or two or more lactones of differing structures can be employed. ε-caprolactone, lactides, and δ-valerolactone are desirable as lactones from the perspective of their reaction properties and availability. However, there is no limitation thereto. Any lactone that can yield polyester by means of ring-opening polymerization will do.

An alcohol, thiol, amine, or the like can be employed as a nucleophilic reagent in the ring-opening polymerization of a lactone. One nucleophilic reagent can be employed, or a mixture of two or more can be employed.

For example, when employing an alcohol and denoting the alcohol as $R^{102}OH$, the $R^{102}$ moiety can be present as the RX— moiety in the structure denoted by Formula (1). Here, X denotes —O—.

When employing a thiol and denoting the thiol as $R^{102}SH$, the $R^{102}S$ moiety can be present as the RX— moiety in the structure denoted by Formula (1). Here, X denotes —S—.

When employing an amine and denoting the amine as $RR^{100}NH$, the $RR^{100}N$— moiety can be present as the RX— moiety in the structure denoted by Formula (1). Here, X denotes —$NR^{100}$—. Each of R and $R^{100}$ is as defined in Formula (1).

However, the compound denoted by Formula (2) is not limited to structures derived from polyesters obtained by the ring-opening polymerization of lactones. It can also be a structure derived from polyester obtained by a known polyester synthesis method such as the polycondensation of a polyvalent carboxylic acid and a polyvalent alcohol or the polycondensation of hydroxycarboxylic acids.

The above synthesis method is but an example and does not limit the present invention in any way. Any known synthesis method can be employed without limitation so long as it permits the synthesis of the compound denoted by Formula (1). Following synthesis, the reaction product can be employed as is, or subjected to purification by a known method as needed and then used, to form the dispersion.

<<Polyalkyleneimine-Polyester Compound>>

The polyalkyleneimine-polyester compound contains a polymer structure (polyalkyleneimine chain) containing two or more alkyleneimine chains in the form of partial structures produced by opening the ring of an alkyleneimine. Examples of the alkyleneimine chains that are partial structures produced by opening the ring of an alkyleneimine are the alkyleneimine chain denoted by formula A below and the alkyleneimine chain denoted by formula B below. In the alkyleneimine chains denoted by the following formulas, the alkyleneimine chain denoted by formula A can contain the position of the bond with the polyester chain. The alkyleneimine chain that is denoted by formula B can be bonded by a salt crosslinking group (described in detail further below) to the polyester chain. Having the polyalkyleneimine-polyester compound contain at least one such alkyleneimine chain imparts a structure in which at least one polyester chain is bonded to the polyalkyleneimine chain. The polyalkyleneimine chains can all have linear chain structures, or can have branched tertiary amine structures. From the perspective of further enhancing dispersion, it is desirable for the polyalkyleneimine chain to contain a branched structure. Examples that contain branched structures are those bonded to the adjacent alkyleneimine chain at $*^1$ in formula A and bonded to the adjacent alkyleneimine chain at $*^2$ in formula B.

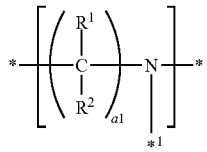

Formula A

In formula A, each of $R^1$ and $R^2$ independently denotes a hydrogen atom or an alkyl group; α1 denotes an integer of equal to or greater than 2; and $*^1$ denotes the site of a bond with a polyester chain, an adjacent alkyleneimine chain, a hydrogen atom, or a substituent.

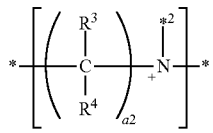

Formula B

In formula B, each of $R^3$ and $R^4$ independently denotes a hydrogen atom or an alkyl group, and a2 denotes an integer of equal to or greater than 2. The alkyleneimine chain denoted by formula B bonds to a polyester chain having an anionic group by $N^+$ in formula B and the anionic group contained in the polyester chain forming a salt crosslinking group.

The * in formulas A and B, and the $*^2$ in formula B, each independently denotes the position of a bond with an adjacent alkyleneimine chain, a hydrogen atom or a substituent.

Formulas A and B will be described in greater detail below.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The alkyleneimine structure with the fewest carbon atoms constituting the ring is ethyleneimine. The main chain of the alkyleneimine chain (ethyleneimine chain) obtained by opening the ring of an ethyleneimine contains 2 carbon atoms. Accordingly, the lower limit of α1 in formula A and of a2 in formula B is 2. That is, each of α1 in formula A and a2 in formula B independently denotes an integer of greater than or equal to 2. From the perspective of adsorption to the surface of metal oxide particles, each of α1 in formula A and a2 in formula B desirably independently denotes an integer of less than or equal to 10, preferably an integer of less than or equal to 6, more preferably an integer of less than or equal to 4, still more preferably an integer of 2 or 3, and yet more preferably, the integer 2.

The bond between the alkyleneimine chain denoted by formula A or the alkyleneimine chain denoted by formula B and a polyester chain will be described further below.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. A polyester chain can also be bonded as a substituent.

The polyalkyleneimine-polyester compound contains at least one polyester chain together with the polyalkyleneimine chain described above. In an embodiment, the polyester chain can bond with the alkyleneimine chain denoted by formula A by means of the nitrogen atom N contained in formula A and a carbonyl bond —(C=O)—, forming —N—(C=O)— at $*^1$ in formula A. In another embodiment, the alkyleneimine chain denoted by formula B and a polyester chain can form a salt crosslinking group by means of the nitrogen cation $N^+$ in formula B and an anionic group present in the polyester chain. An example of the salt crosslinking group is one formed by an oxygen anion $O^-$ contained in the polyester chain and the $N^+$ in formula B. However, this is not a limitation.

The polyester chain denoted by formula 1 below is an example of a polyester chain bonding to the nitrogen atom N contained in formula A by means of a carbonyl bond —(C=O)— to the alkyleneimine chain denoted by formula A. The polyester chain denoted by formula 1 below can bond to the alkyleneimine chain denoted by formula A at the bond position denoted by *[1] by the formation of —N—(C=O)— by the nitrogen atom contained in the alkyleneimine chain and the carbonyl group —(C=O)— contained in the polyester chain.

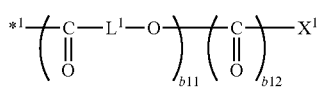

Formula 1

The polyester chain denoted by formula 2 below is an example of a polyester chain that can bond to the alkyleneimine chain denoted by formula B by means of the $N^+$ in formula B and an anionic group contained in the polyester chain forming a salt crosslinking group. In the polyester group denoted by formula 2 below, the oxygen anion $O^-$ and the $N^+$ in formula B can form a salt crosslinking group.

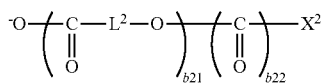

Formula 2

Each of $L^1$ in formula 1 and $L^2$ in formula 2 independently denotes a divalent linking group. A desirable example of a divalent linking group is an alkylene group having 3 to 30 carbon atoms. As set forth above, the number of carbon atoms in an alkylene group refers to the portion (main chain portion) excluding the substituent when the alkylene group comprises a substituent.

Each of b11 in formula 1 and b21 in formula 2 independently denotes an integer of equal to or greater than 2; for example, an integer of equal to or less than 200.

Each of b12 in formula 1 and b22 in formula 2 independently denotes 0 or 1.

Each of $X^1$ in formula 1 and $X^2$ in formula 2 independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

Specific examples of substituted and unsubstituted alkyl groups and haloalkyl groups are: a methyl group, ethyl group, propyl group, butyl group, pentyl group, hexyl group, heptyl group, octyl group, nonyl group, decyl group, undecyl group, dodecyl group, tridecyl group, pentadecyl group, hexadecyl group, heptadecyl group, octadecyl group, eicosyl group, isopropyl group, isobutyl group, isopentyl group, 2-ethylhexyl group, tert-octyl group, 2-hexyldecyl group, cyclohexyl group, cyclopentyl group, cyclohexylmethyl group, octylcyclohexyl group, 2-norbornyl group, 2,2,4-trimethylpentyl group, acetylmethyl group, acetylethyl group, hydroxymethyl group, hydroxyethyl group, hydroxylpropyl group, hydroxybutyl group, hydroxypentyl group, hydroxyhexyl group, hydroxyheptyl group, hydroxyoctyl group, hydroxynonyl group, hydroxydecyl group, chloromethyl group, dichloromethyl group, trichloromethyl group, bromomethyl group, 1,1,1,3,3,3-hexafluoroisopropyl group, heptafluoropropyl group, pentadecafluoroheptyl group, nonadecafluorononyl group, hydroxyundecyl group, hydroxydodecyl group, hydroxypentadecyl group, hydroxyheptadecyl group, and hydroxyoctadecyl group.

Examples of alkoxy groups are a methoxy group, ethoxy group, propyloxy group, hexyloxy group, methoxyethoxy group, methoxyethoxyethoxy group, and methoxyethoxyethoxymethyl group.

Polyalkyleneoxyalkyl groups are monovalent substituents denoted by $R^{10}(OR^{11})n(O)m-$. $R^{10}$ denotes an alkyl group, $R^{11}$ denotes an alkylene group, n denotes an integer of equal to or greater than 2, and m denotes 0 or 1.

The alkyl group denoted by $R^{10}$ is as described for the alkyl groups denoted by $X^1$ and $X^2$. The details of the alkylene group denoted by $R^{11}$ are as follows. The above description of the alkyl groups denoted by $X^1$ and $X^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 1 and 2 set forth above can be structures derived from polyesters obtained by known polyester synthesis methods. An example of a method of polyester synthesis is the ring-opening polymerization of lactone. Reference can be made to the description set forth above for formula (2) with regard to lactones. Reference can be made to Japanese Unexamined Patent Publication (KOKAI) No. 2015-28830, which is expressly incorporated herein by reference in its entirety, paragraph 0057, for example, with regard to nucleophilic reagents for lactone ring-opening polymerization. However, the polyester chain is not limited to structures derived from polyesters obtained by lactone ring-opening polymerization, and can have a structure derived from polyester obtained by a known polyester synthesis method such as the polycondensation of a polyvalent carboxylic acid and a polyhydric alcohol and the polycondensation of a hydroxycarboxylic acid.

In one embodiment, the polyalkyleneimine-polyester compound is desirably a compound in which the ratio accounted for by polyalkyleneimine chains (also referred to as the "polyalkyleneimine chain ratio" hereinafter) is desirably less than 5.00 weight % and/or the number average molecular weight of the polyalkyleneimine chains desirably falls within a range of 300 to 3,000. The number average molecular weight and polyalkyleneimine chain ratio of the polyalkyleneimine chains contained in the polyalkyleneimine-polyester compound are values that are determined by the methods described in Japanese Unexamined Patent Publication (KOKAI) No. 2015-28830. A description of compounds covered by the above polyalkyleneimine-polyester compound (described as "polyalkyleneimine derivatives" in the above publication) is given in above Japanese Unexamined Patent Publication (KOKAI) 2015-28830.

However, in Japanese Unexamined Patent Publication (KOKAI) 2015-28830, this compound is not used to prepare a metal oxide particle dispersion that substantially does not contain ferromagnetic powder, and thus provides no description suggesting that change in the surface state of the magnetic layer with repeated running can be inhibited in a magnetic recording medium having a magnetic layer formed using this dispersion. This point was initially discovered by the present inventors as a result of extensive research.

The above polyester compound can be employed in the form of commercial products. Examples of commercial products are: DISPERBYK-102 (polyester containing a phosphoric acid group made by BYK Additives & Instruments); DISPERBYK-111 (also made by BYK Additives & Instruments); and SOLSPERSE 26000, SOLSPERSE 36000, SOLSPERSE 24000 GR, SOLSPERSE 32000, SOLSPERSE 39000, and SOLSPERSE 71000 (all made by Lubrizol Corporation).

<<Content>>

Just one of the above-described polyester compounds, or two or more having different structures, can be incorporated into the dispersion. The compound denoted by formula (1) can be employed as a mixture of two or more structural isomers. For example, when two or more structural isomers are obtained by a synthesis reaction of the compound denoted by formula (1), this mixture can be used to prepare the above dispersion. The content of the polyester compound in the dispersion is desirably greater than or equal to 1.0 weight part, preferably greater than or equal to 3.0 weight parts, per 100.0 weight parts of metal oxide particles. To enhance the recording density, the fill rate of ferromagnetic powder in the magnetic layer is desirably increased. For this reason, the content of components other than ferromagnetic powder in the magnetic layer is desirably relatively low. From these perspectives, the content of polyester compound is desirably less than or equal to 50.0 weight parts, preferably less than or equal to 40.0 weight parts, per 100.0 weight parts of metal oxide particles.

<Other Components>

The above dispersion contains the metal oxide particles, solvent, and polyester compound set forth above, and can also contain one or more optional components. An example of such a component is binder. The various resins that are commonly employed as binders in particulate magnetic recording media can be employed without limitation as binders. For specific examples, reference can be made to the description relating to the binders that can be added to the magnetic liquid described further below. Examples of resins that are desirable as binders contained in the above dispersion are polyurethane resins and vinyl chloride resins. Polyurethane resins in the form of polyether polyurethane resin and polyester polyurethane resins are suitably employed. Polyurethane resins are also desirable resins in that they can dissolve well in ketone solvents, which are suitable solvents. The content of the binder in the dispersion desirably falls within a range of 0 to 20 weight parts, for example, per 100 weight parts of metal oxide particles.

As set forth above, the weight average molecular weight of the polyester compound is presumed by the present inventors to desirably be lower than that of the resins that are commonly employed as binders. For this reason, when incorporating binder into the dispersion, the weight average molecular weight desirably falls within a range of greater than 20,000 but less than or equal to 120,000, preferably within a range of 30,000 to 100,000, and more preferably, within a range of 30,000 to 60,000. The weight average molecular weight of the binder contained in the magnetic liquid described further below also desirably falls within the above range.

<Method of Preparing the Dispersion>

The dispersion can be prepared by simultaneously or successively mixing and dispersing the above-described components. The dispersion can be conducted by a known dispersion method such as bead dispersion employing dispersion beads. Glass beads, zirconia beads, titania beads, steel balls, and alumina beads are suitable as dispersion beads. These dispersion beads are desirably employed by optimizing the bead diameter and fill rate. A known dispersion device can be employed. The solid component concentration of the dispersion falls, for example, within a range of 5 to 20 weight %. The term "solid component concentration" refers to the concentration of the combined quantity of all components except the solvent in the dispersion.

The metal oxide particle dispersion according to an aspect of the present invention set forth above can be suitably employed to prepare the magnetic layer-forming composition of a particulate magnetic recording medium. This point will be further described below.

[Method of Manufacturing Magnetic Layer-Forming Composition of Particulate Magnetic Recording Medium]

A further aspect of the present invention relates a method of manufacturing a magnetic layer-forming composition of a particulate magnetic recording medium, including mixing the above metal oxide particle dispersion with ferromagnetic powder.

The above manufacturing method will be described in greater detail below.

The dispersion is as set forth above.

<Ferromagnetic Powder>

The ferromagnetic powder that is mixed with the above dispersion is not specifically limited. It is desirably ferromagnetic powder with an average particle size of less than or equal to 50 nm. The ferromagnetic powder with an average particle size of less than or equal to 50 nm is desirably ferromagnetic powder capable of achieving high-density recording. From the perspective of the stability of magnetization, the average particle size is desirably greater than or equal to 10 nm and preferably less than or equal to 20 nm.

Hexagonal ferrite powder is a specific example of desirable ferromagnetic powder. From the perspectives of achieving higher density recording and magnetization stability, the average particle size (for example, average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill rate) of the ferromagnetic powder in the magnetic layer that is formed using the above magnetic layer-forming composition desirably falls within a range of 50 to 90 weight %, preferably within a range of 60 to 90 weight %. A high fill rate is desirable from the perspective of increasing the recording density.

<Magnetic Liquid>

(Solvent)

The ferromagnetic powder can be mixed with the dispersion as powder, and mixing it as a magnetic liquid containing ferromagnetic powder, solvent, and binder is desirable from the perspective of enhancing dispersion of the ferromagnetic powder. Examples of the solvent contained in the magnetic liquid are the various organic solvents that are commonly employed in the manufacturing of particulate magnetic recording media. Specific examples are: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane. They can be employed in any ratio.

Of these, ketone solvents are desirably employed from the perspective of adsorption of binder to the surface of the ferromagnetic powder and the solubility of the binders that are commonly employed in magnetic recording media.

(Binder)

The various resins that are commonly employed as binders in particulate magnetic recording media can be employed without limitation as binders contained in the magnetic liquid. For example, polyurethane resins, polyester resins, polyamide resins, vinyl chloride resins, acrylic resins prepared by copolymerization of styrene, acrylonitrile, methyl methacrylate and the like, nitrocellulose and other cellulose resins, epoxy resins, phenoxy resins, polyvinyl acetal, polyvinyl butyral, and other polyvinyl alkyrals can be employed singly, or a plurality of such resins can be mixed for use. Of these, desirable resins are the polyurethane resins, acrylic resins, cellulose resins, and vinyl chloride resins. The preferred resins are the polyurethane resins and vinyl chloride resins. These resins can be employed as binders in the nonmagnetic layer, described further below.

Reference can be made to Japanese Unexamined Patent Publication (KOKAI) No. 2010-24113, which is expressly incorporated herein by reference in its entirety, paragraphs 0028 to 0031, with regard to the above binder. The binder content, as the content in the magnetic layer-forming composition prepared by mixing the above dispersion and magnetic liquid, for example, falls within a range of 5.0 to 50.0 weight parts, desirably within a range of 10.0 to 30.0 weight parts, per 100.0 weight parts of ferromagnetic powder.

(Other Components)

One or more additives can be added as needed to the magnetic liquid. Examples of additives are the various additives that are commonly employed to form particulate magnetic recording media, such as lubricants, dispersing agents, dispersion adjuvants, fungicides, antistatic agents, oxidation inhibitors, and carbon black. A further example is nonmagnetic colloidal particles such as silica colloidal particles. Commercial products can be suitably selected based on the properties desired, or the additives employed can be manufactured by known methods. It suffices to suitably set the quantity added. The present inventors presume the polyester compound set forth above to be a suitable compound as a component (dispersing agent) contributing to enhancing dispersion of the ferromagnetic powder. Accordingly, one or more of the above polyester compounds are desirably added to the magnetic liquid. In that case, the content of the polyester compound in the magnetic liquid is desirably greater than or equal to 0.5 weight part, preferably greater than or equal to 1.0 weight part, per 100.0 weight parts of ferromagnetic powder. To increase the recording density, the fill rate of the ferromagnetic powder in the magnetic layer is desirably high. In this regard, the content of components other than ferromagnetic powder is desirably kept relatively low. From this perspective, the content of the polyester compound in the magnetic liquid is desirably less than or equal to 50.0 weight parts, preferably less than or equal to 40.0 weight parts, and more preferably, less than or equal to 30.0 weight parts per 100.0 weight parts of ferromagnetic powder.

The magnetic liquid, and/or the magnetic layer-forming composition that is prepared by mixing the magnetic liquid and the above dispersion, can contain a known curing agent. A magnetic layer formed using a magnetic layer-forming composition containing a curing agent will normally contain a reaction product in which binder and curing agent are crosslinked. A curing agent is desirably employed to increase the strength of the magnetic layer. From the perspective of the crosslinking reaction and the like, polyisocyanate is desirable as a curing agent. Reference can be made to Japanese Unexamined Patent Publication (KOKAI) No. 2011-216149, paragraphs 0124 and 0125, for details regarding polyisocyanate. The curing agent can be added to the magnetic layer-forming composition in a quantity of, for example, 0 to 80.0 weight parts, desirably 50.0 to 80.0 weight parts from the perspective of strengthening the magnetic layer, per 100.0 weight parts of binder for use.

The magnetic liquid can be prepared by simultaneously or sequentially admixing in any order the various components set forth above. The method of preparing the magnetic liquid is not limited. Techniques that are known in the preparation of the magnetic layer-forming compositions of particulate magnetic recording media can be applied without limitation. Techniques that are known in the preparation of the magnetic layer-forming compositions of particulate magnetic recording media can also be applied without limitation to mixing of the dispersion and the magnetic liquid. Simultaneous with, or subsequent to, mixing of the magnetic liquid and dispersion, one or more optional components (such as the various above additives and/or curing agents) can also be added.

A solid component concentration in the magnetic liquid of about 10 to 30 weight % is desirable from the perspective of facilitating preparation of the magnetic liquid and dispersion of the ferromagnetic powder and the like in the magnetic liquid. The term "solid component concentration in the magnetic liquid" refers to the concentration of the combined quantity of all components except for the solvent in the magnetic liquid. Taking into account the fill rate of the ferromagnetic powder in the magnetic layer that is formed and the effects exhibited by the metal oxide particles (abrasiveness, lowering of coefficient of friction during running, and the like), the magnetic liquid and the dispersion are desirably mixed so that the quantity of metal oxide particles is 1.0 to 20.0 weight parts per 100.0 weight parts of ferromagnetic powder.

[Method of Manufacturing Magnetic Recording Medium]

A further aspect of the present invention relates to a method of manufacturing a particulate magnetic recording medium, including: manufacturing a magnetic layer-forming composition by the above method of manufacturing a magnetic layer-forming composition and forming a magnetic layer through coating the magnetic layer-forming composition that has been manufactured on a nonmagnetic support.

In the method of manufacturing a particulate magnetic recording medium, with the exception that a magnetic layer-forming composition is manufactured by the method of manufacturing a magnetic layer-forming composition set forth above, known techniques with regard to particulate magnetic recording media can be applied without limitation. For example, a magnetic layer can be formed on the surface of a nonmagnetic support that is running, or on the surface of a nonmagnetic layer that has been optionally formed on a nonmagnetic support, by adjusting the coating quantity so that a magnetic layer of prescribed thickness will be formed and coating the magnetic layer-forming composition. Reference can be made, for example, to Japanese Unexamined Patent Publication (KOKAI) No. 2013-131285, paragraphs 0038 to 0040, with regard to the process of manufacturing a magnetic recording medium.

(Thickness of Nonmagnetic Support, Thickness of Various Layers)

The thickness of the nonmagnetic support and of the various layers of the magnetic recording medium manufactured by the manufacturing method set forth above will be given next. The thickness of the nonmagnetic support is desirably 3.0 µm to 80.0 µm.

The thickness of the magnetic layer can be optimized based on the saturation magnetization of the magnetic head employed, the length of the head gap, and the bandwidth of the recording signal. It is generally 10 nm to 150 nm, desirably 20 nm to 120 nm, and preferably, 30 nm to 100 nm. The magnetic layer is comprised of at least a single layer, and can also be separated into two or more layers having different magnetic characteristics. Structures relating to known multilayered magnetic layers can be applied.

When the magnetic recording medium being manufactured contains a nonmagnetic layer, the thickness of the nonmagnetic layer is, for example, 0.1 µm to 3.0 µm, desirably 0.1 µm to 2.0 µm, and preferably, 0.1 µm to 1.5 µm. The nonmagnetic layer in the present invention includes a substantially nonmagnetic layer containing trace quantities of ferromagnetic powder, for example, either as impurities or intentionally, in addition to the nonmagnetic powder. The substantially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic layer desirably has no residual magnetic flux density or coercive force.

When a backcoat layer is present on the opposite side of the nonmagnetic support from the side on which the magnetic layer is present in the magnetic recording medium that has been manufactured, the thickness of the backcoat layer is desirably less than or equal to 0.9 µm, preferably 0.1 µm to 0.7 µm.

The magnetic recording medium that has been manufactured by the manufacturing method set forth above can have properties such that the change in friction and the change in the centerline average surface roughness Ra of the surface of the magnetic layer as evaluated by the methods described in Examples further below are both evaluated as A. A magnetic recording medium having such properties can be provided by forming the magnetic layer with the magnetic layer-forming composition prepared by mixing the metal oxide particle dispersion containing the above polyester compound with ferromagnetic powder. The metal oxide particle dispersion containing the polyester compound can contain the metal oxide particles dispersed by the method described in Examples further below in a state of dispersion evaluated as A in the evaluation of dispersion.

EXAMPLES

The present invention is described with greater specifically through Examples below. However, the present invention is not limited to the embodiments given in Examples. Unless specifically stated otherwise, the "parts" and "%" given below are based on weight. The "room temperature" referred to below falls within a range of 20° C. to 25° C.

[Synthesis Example of Polyalkyleneimine-Polyester Compound]

<Synthesis of Polyester Compound 1>

In a 300 mL three-necked flask were mixed 4.2 g of n-octanoic acid (made by Wako Pure Chemical Industries, Ltd.), 25 g of ε-caprolactone (Praxel M made by Daicel Corporation), and 1.4 g of monobutyltin oxide (Tokyo Chemical Industry Co., Ltd.) and the mixture obtained was heated for 1 hour at a mixture temperature of 160° C. A 25 g quantity of ε-caprolactone was added dropwise over 5 hours and the mixture was stirred for 2 hours. The mixture was then cooled to room temperature to obtain intermediate polyester 1.

In a 300 mL three-necked flask were mixed 0.96 g of polyethyleneimine (SP-006 made by Nippon Shokubai Co., Ltd.; number average molecular weight 600) and 40 g of intermediate polyester 1 to obtain a mixture, and the mixture was heated for 3 hours at a mixture temperature of 110° C. to obtain polyester compound 1.

<Synthesis of Polyester Compound 7>

In a 300 mL three-necked flask were mixed 1.35 g of polyethyleneimine (SP-006 made by Nippon Shokubai Co., Ltd.; number average molecular weight 600) and 40 g of intermediate polyester 1 to obtain a mixture, and the mixture was heated for 3 hours at a mixture temperature of 110° C. to obtain polyester compound 7.

<Synthesis of Polyester Compound 8>

In a 300 mL three-necked flask were mixed 0.46 g of polyethyleneimine (SP-006 made by Nippon Shokubai Co., Ltd.; number average molecular weight 600) and 40 g of intermediate polyester 1 to obtain a mixture, and the mixture was heated for 3 hours at a mixture temperature of 110° C. to obtain polyester compound 8.

<Synthesis of Polyester Compound 2>

In a 300 mL three-necked flask were mixed 5.2 g of methoxyethoxyethoxyacetic acid, 25 g of ε-caprolactone (Praxel M made by Daicel Corporation) and 1.4 g of monobutyltin oxide (Tokyo Chemical Industry Co., Ltd.) and the mixture obtained was heated for 1 hour at a mixture temperature of 160° C. A 25 g quantity of ε-caprolactone was added dropwise over 5 hours and the mixture was stirred for 2 hours. The mixture was then cooled to room temperature to obtain intermediate polyester 2.

In a 300 mL three-necked flask were mixed 0.96 g of polyethyleneimine (SP-006 made by Nippon Shokubai Co., Ltd.; number average molecular weight 600) and 40 g of intermediate polyester 2 to obtain a mixture, and the mixture was heated for 3 hours at a mixture temperature of 110° C. to obtain polyester compound 2.

<Synthesis of Polyester Compound 3>

In a 300 mL three-necked flask were mixed 8.3 g of stearic acid (made by Wako Pure Chemical Industries, Ltd.), 25 g of ε-caprolactone (Praxel M made by Daicel Corporation) and 1.4 g of monobutyltin oxide (Tokyo Chemical Industry Co., Ltd.) and the mixture obtained was heated for 1 hour at a mixture temperature of 160° C. A 25 g quantity of ε-caprolactone was added dropwise over 5 hours and the mixture was stirred for 2 hours. The mixture was then cooled to room temperature to obtain intermediate polyester 3.

In a 300 mL three-necked flask were mixed 0.96 g of polyethyleneimine (SP-006 made by Nippon Shokubai Co., Ltd.; number average molecular weight 600) and 40 g of intermediate polyester 3 to obtain a mixture, and the mixture was heated for 3 hours at a mixture temperature of 110° C. to obtain polyester compound 3.

[Synthesis Example of Polyester Compound Denoted by Formula (1)]

<Synthesis of Polyester Compound 4>

In a 300 mL three-necked flask were mixed 3.8 g of 2-ethyhexyl alcohol (made by Wako Pure Chemical Industries, Ltd.), 50 g of ε-caprolactone (Praxel M made by Daicel Corporation) and 25 mg of monobutyltin oxide (Tokyo Chemical Industry Co., Ltd.) and the mixture obtained was heated and stirred for 5 hours at a mixture temperature of 110° C. The mixture was then cooled to room temperature to obtain intermediate polyester 4.

In a 300 mL three-necked flask were mixed 2.2 g of 1,2,3,4-butanetetracarboxylic acid dianhydride (made by Wako Pure Chemical Industries) and 40 g of intermediate polyester 4 to obtain a mixture, and the mixture was heated for 3 hours at a mixture temperature of 110° C. to obtain polyester compound 4.

<Synthesis of Polyester Compound 5>

In a 300 mL three-necked flask were mixed 5.7 g of diethyleneglycol monobenzyl ether (made by Wako Pure Chemical Industries, Ltd.), 50 g of ε-caprolactone (Praxel M made by Daicel Corporation), and 25 mg of monobutyltin oxide (Tokyo Chemical Industry Co., Ltd.) and the mixture obtained was heated for 5 hours at a mixture temperature of 110° C. The mixture was then cooled to room temperature to obtain intermediate polyester 5.

In a 300 mL three-necked flask were mixed 2.1 g of 1,2,3,4-butanetetracarboxylic acid dianhydride (made by Wako Pure Chemical Industries) and 40 g of intermediate polyester 5 to obtain a mixture, and the mixture was heated for 3 hours at a mixture temperature of 110° C. to obtain polyester compound 5.

<Synthesis of Polyester Compound 6>

In a 300 mL three-necked flask were mixed 7.9 g of octadecanol (made by Wako Pure Chemical Industries, Ltd.), 50 g of ε-caprolactone (Praxel M made by Daicel Corporation), and 25 mg of monobutyltin oxide (Tokyo Chemical Industry Co., Ltd.) and the mixture obtained was heated for 5 hours at a mixture temperature of 110° C. The mixture was then cooled to room temperature to obtain intermediate polyester 6.

In a 300 mL three-necked flask were mixed 2.0 g of 1,2,3,4-butanetetracarboxylic acid dianhydride (made by Wako Pure Chemical Industries) and 40 g of intermediate polyester 6 to obtain a mixture, and the mixture was heated for 3 hours at a mixture temperature of 110° C. to obtain polyester compound 6.

<Synthesis of Polyester Compound 9>

In a 300 mL three-necked flask were mixed 2.3 g of 2-ethylhexyl alcohol (made by Wako Pure Chemical Industries), 50 g of ε-caprolactone (Praxel M made by Daicel Corporation), and 25 mg of monobutyltin oxide (Tokyo Chemical Industry Co., Ltd.) to obtain a mixture, and the mixture was heated and stirred for 5 hours at a mixture temperature of 110° C. The mixture was then cooled to room temperature to obtain intermediate polyester 7.

In a 300 mL three-necked flask were mixed 1.3 g of 1,2,3,4-butanetetracarboxylic acid dianhydride (made by Wako Pure Chemical Industries) and 40 g of intermediate polyester 7 to obtain a mixture, and the mixture was heated for 3 hours at a mixture temperature of 110° C. to obtain polyester compound 9.

<Synthesis of Polyester Compound 10>

In a 300 mL three-necked flask were mixed 11.4 g of 2-ethylhexyl alcohol (made by Wako Pure Chemical Industries), 50 g of ε-caprolactone (Praxel M made by Daicel Corporation), and 25 mg of monobutyltin oxide (Tokyo Chemical Industry Co., Ltd.) to obtain a mixture, and the mixture was heated and stirred for 5 hours at a mixture temperature of 110° C. The mixture was then cooled to room temperature to obtain intermediate polyester 8.

In a 300 mL three-necked flask were mixed 5.7 g of 1,2,3,4-butanetetracarboxylic acid dianhydride (made by Wako Pure Chemical Industries) and 40 g of intermediate polyester 8 to obtain a mixture, and the mixture was heated for 3 hours at a mixture temperature of 110° C. to obtain polyester compound 10.

[Synthesis Example of Synthesizing Compound 11 Employed in Comparative Example]

In a 300 mL three-necked flask were mixed 12.3 g of polyethyleneimine (SP-006 made by Nippon Shokubai Co., Ltd., number average molecular weight 600) and 40 g of n-octanoic acid (made by Wako Pure Chemical Industries) to obtain a mixture, and the mixture was heated for 3 hours at 110° C. to obtain compound 11.

[Identifying the Compounds and Measuring the Weight Average Molecular Weight]

Polyester compounds 1 to 3, 7, and 8 were polyalkyleneimine-polyethylene compounds containing ethyleneimine chains in which $R^1$ and $R^2$ in formula A were hydrogen atoms and α1 denoted 2; and/or ethyleneimine chains in which $R^3$ and $R^4$ in formula B were hydrogen atoms and a2 denoted 2.

In the polyester chains present in polyester compounds 1 to 3, 7, and 8, the structure bonded to the ethyleneimine chain denoted by formula A was partial structure a below and the structure bonded to the ethyleneimine chain denoted by formula B was partial structure b below. In partial structure a, $*^1$ denotes the position of the bond with $*^1$ in formula A. In partial structure b, the oxygen anion $O^-$ forms a salt crosslinking group with the $N^+$ in the ethyleneimine chain denoted by formula B, thereby bonding to the ethyleneimine chain denoted by formula B. In polyester compounds 1 to 3, 7, and 8, n is 15.

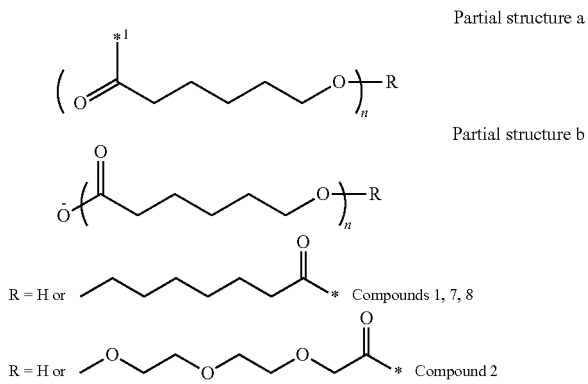

-continued

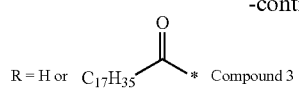 Compound 3

(In the above, * denotes the position of a bond with an adjacent oxygen atom.)

Compound 11 employed in the comparative example is a compound in which are bonded a structure in which partial structure c below is bonded to an ethyleneimine chain in which α1 is 2 and $R^1$ and $R^2$ denote hydrogen atoms in formula A, and/or a structure in which partial structure d below is bonded to an ethyleneimine chain in which a2 is 2 and $R^3$ and $R^4$ denote hydrogen atoms in formula B. In partial structure c, *[1] denotes the position of bond with *[1] in formula A. In partial structure d, oxygen anion $O^-$ is bonded to the ethyleneimine chain denoted by formula B by forming a salt crosslinking group with the $N^+$ in the ethyleneimine chain denoted by formula B.

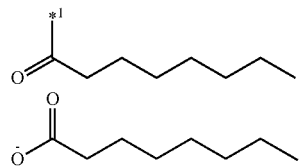 Compound 11

Polyester compounds 4 to 6, 9, and 10 are obtained as mixtures of the compounds of the following structures and their structural isomers.

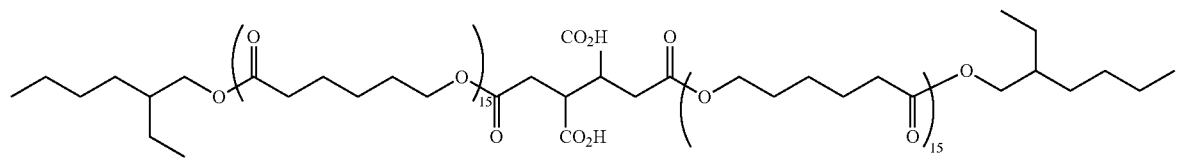
Compound 4

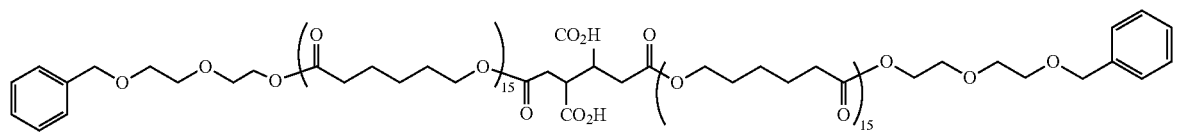
Compound 5

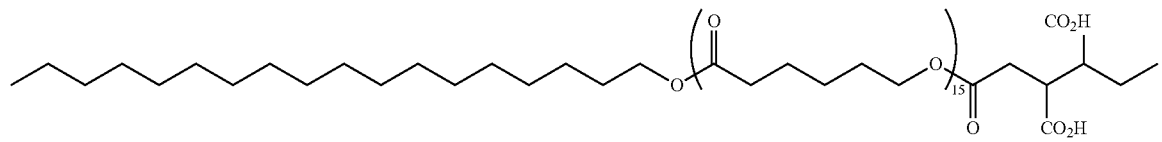
Compound 6

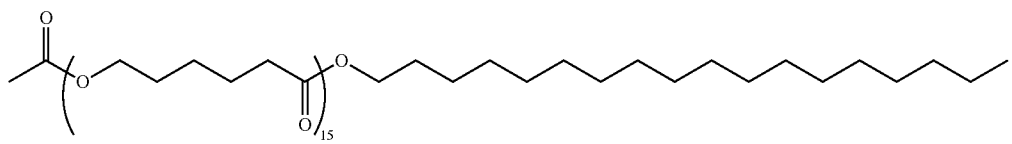

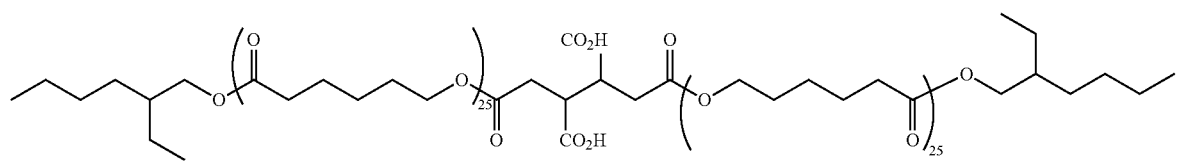
Compound 9

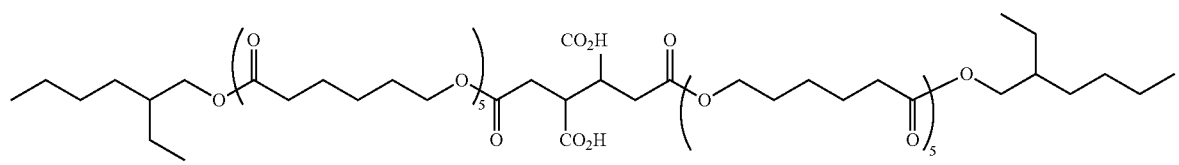
Compound 10

As an example, structural isomers of polyester compounds 4 to 6 are given below.
Structural Isomers of Polyester Compound 4
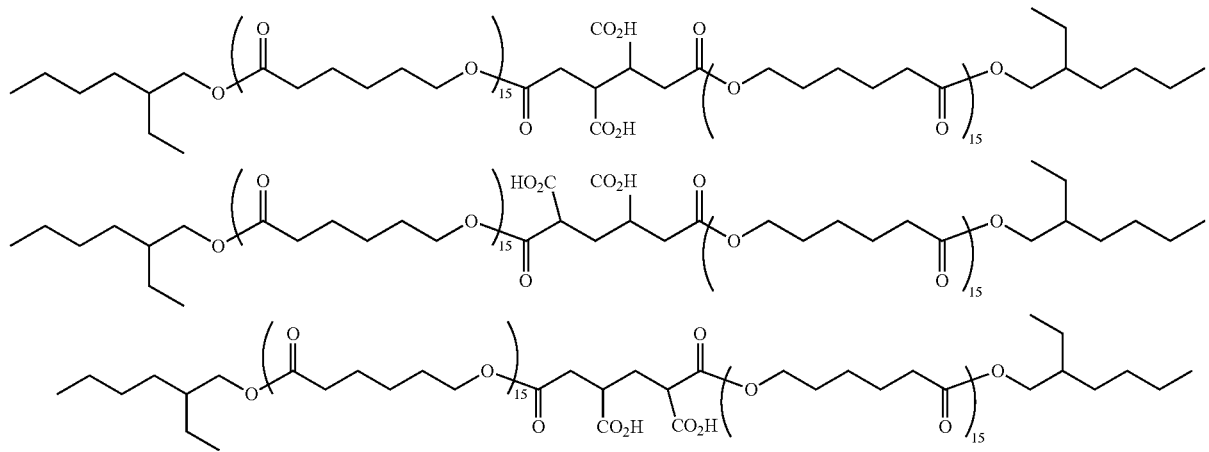
Structural Isomers of Polyester Compound 5

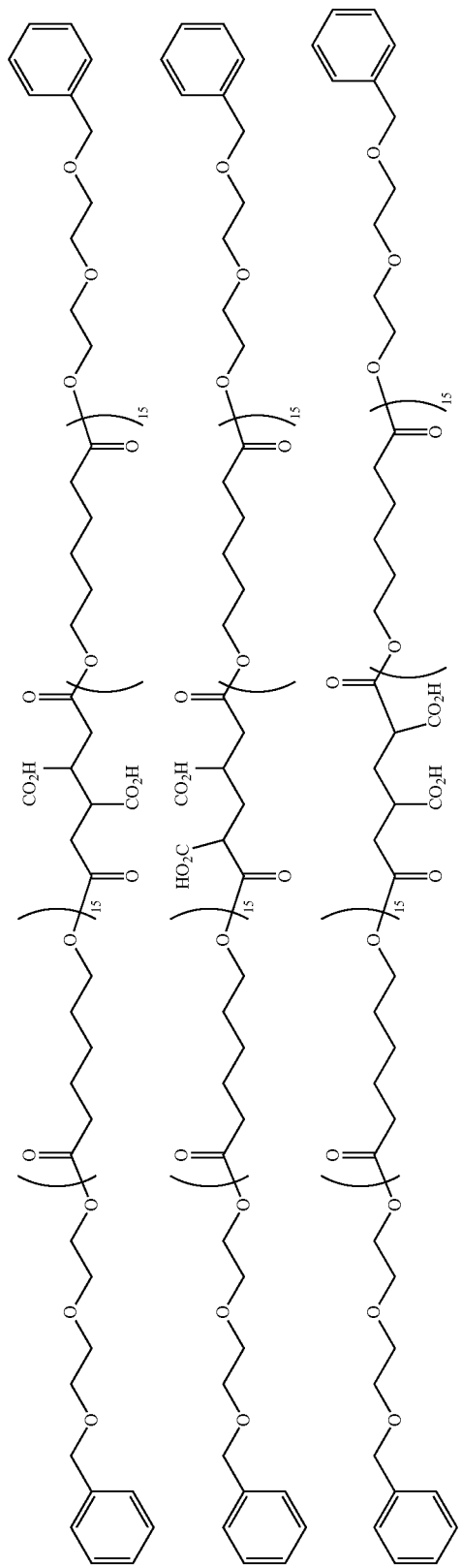

Structural Isomers of Polyester Compound 6

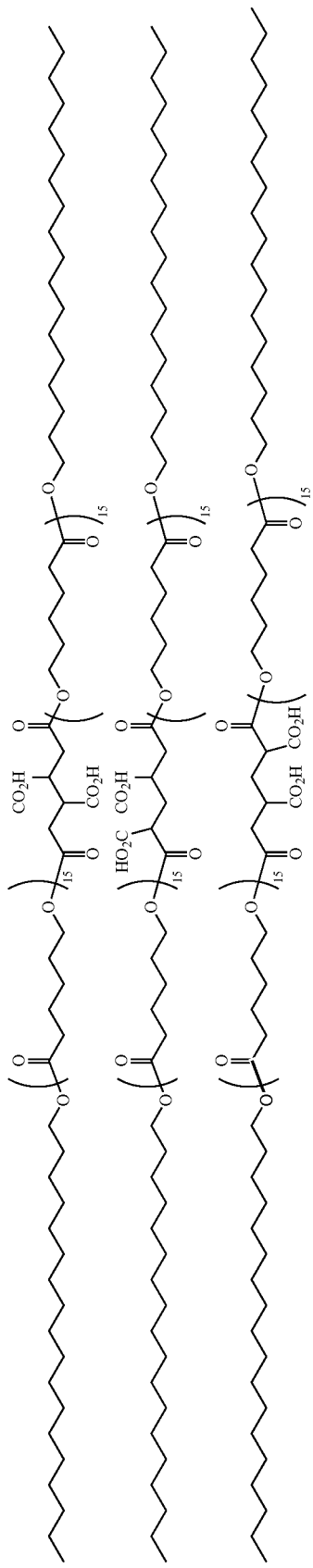

The fact that the targeted compounds were obtained by the various synthesis examples was confirmed by nuclear magnetic resonance ($^1$H-NMR), GPC, and acid value measurement. The acid value measurement was conducted in accordance with JIS K 2501 (2003).

The weight average molecular weight of each of the compounds obtained in the various synthesis examples and of each the commercial polyester compounds employed in Examples set forth further below were obtained by GPC and converted to a polyester equivalent. The values obtained are given in Table 1. The number average molecular weight of the polyethyleneimines set forth above are the values indicated in the catalogs of the manufacturers.

(Measurement Conditions)
Device: HLC-8320 GPC EcoSEC made by Tosoh
Guard column: TOSOH TSKguardcolumn Super AW-H
Separation column: TOSOH TSKgel Super AWM-H (6.0 mm×15 cm), three columns connected in series
Eluent: N-methylpyrrolidone (containing 10 mmol/L LiBr)
Flow rate: 0.35 mL/min
Detector: Refractive index (RI)
Temperature: Column=40° C., inlet=40° C., RI=40° C.
Analysis time: 35 min
Quantity of sample injected: 60 μL
Measurement sample concentration: 1.0 weight %
Calibration curve concentration: 0.02 weight %
Standard sample used in calibration curve: TOSOH TSK standard polystyrene
Standard polystyrene model number F-80 (TS-201) Molecular weight $7.06 \times 10^5$
Standard polystyrene model number F-20 (TS-140) Molecular weight $1.90 \times 10^5$
Standard polystyrene model number F-4 (TS-202) Molecular weight $3.79 \times 10^4$
Standard polystyrene model number F-1 (TS-508) Molecular weight $1.02 \times 10^4$
Standard polystyrene model number A-2500 (TS-502) Molecular weight $2.63 \times 10^3$
Standard polystyrene model number A-500 (TS-505) Molecular weight 682, 578, 474, 370, 266
(The Above Standard Polystyrene Molecular Weights are the Catalog Values of Tosoh Corp.)

TABLE 1

| Compound | Weight average molecular weight |
| --- | --- |
| Polyester compound 1 | 7800 |
| Polyester compound 2 | 6400 |
| Polyester compound 3 | 8600 |
| Polyester compound 4 | 6900 |
| Polyester compound 5 | 6600 |
| Polyester compound 6 | 6700 |
| Polyester compound 7 | 6800 |
| Polyester compound 8 | 8700 |
| Polyester compound 9 | 7100 |
| Polyester compound 10 | 2600 |
| DISPERBYK-102 (made by BYK Additives & Instruments) | 1000 |
| Compound 11 | 850 |

For polyester compounds 1, 7, and 8, the polyalkyleneimine chain ratio was calculated from the results of elemental analysis by the combustion method and the results of two NMR analysis by $^1$H-NMR and $^{13}$C-NMR as described in Japanese Unexamined Patent Publication (KOKAI) No. 2015-28830. The results are given below.
Polyester compound 1: 2.34 weight %
Polyester compound 7: 3.38 weight %
Polyester compound 8: 1.15 weight %

The following are the values of the weight average molecular weight as measured by the above methods for the following components, described further below, used in the Examples:
Polyester polyurethane resin (UR-4800 made by Toyobo): 36,000
Polyvinyl chloride copolymer (MR104 made by Zeon Corp.): 26,000

[Preparation Example of Preparing Metal Oxide Particle Dispersion]

Example 1: Preparation of Alumina Dispersion

With 100.0 weight parts of alumina powder (HIT-70, made by Sumitomo Chemical Co., Ltd.) were mixed 10.0 weight parts of polyester compound 1, 31.0 weight parts of a 32% solution (solvent: mixed solvent of methyl ethyl ketone and toluene) of polyester polyurethane resin (UR-4800 made by Toyobo), and 835.0 weight parts of solvent in the form of a 1:1 (volume ratio) mixed solvent of methyl ethyl ketone and cyclohexanone and the mixture was dispersed for 5 hours in a paint shaker in the presence of zirconia beads (YTZ balls made by Nikkato) 0.1 mm in diameter. Following dispersion, the mixture was filtered to separate the dispersion and the beads, yielding an alumina dispersion.

Example 2: Preparation of Alumina Dispersion

With the exception that polyester compound 1 was replaced with polyester compound 2 in the preparation of an alumina dispersion in Example 1, an alumina dispersion was prepared by the same method as in Example 1.

Example 3: Preparation of Alumina Dispersion

With the exception that polyester compound 1 was replaced with polyester compound 3 in the preparation of an alumina dispersion in Example 1, an alumina dispersion was prepared by the same method as in Example 1.

Example 4: Preparation of Alumina Dispersion

With the exception that polyester compound 1 was replaced with polyester compound 4 in the preparation of an alumina dispersion in Example 1, an alumina dispersion was prepared by the same method as in Example 1.

Example 5: Preparation of Alumina Dispersion

With the exception that polyester compound 1 was replaced with polyester compound 5 in the preparation of an alumina dispersion in Example 1, an alumina dispersion was prepared by the same method as in Example 1.

Example 6: Preparation of Alumina Dispersion

With the exception that polyester compound 1 was replaced with polyester compound 6 in the preparation of an alumina dispersion in Example 1, an alumina dispersion was prepared by the same method as in Example 1.

Example 7: Preparation of Alumina Dispersion

With the exception that polyester compound 1 was replaced with polyester compound 7 in the preparation of an alumina dispersion in Example 1, an alumina dispersion was prepared by the same method as in Example 1.

Example 8: Preparation of Alumina Dispersion

With the exception that polyester compound 1 was replaced with polyester compound 8 in the preparation of an alumina dispersion in Example 1, an alumina dispersion was prepared by the same method as in Example 1.

Example 9: Preparation of Alumina Dispersion

With the exception that polyester compound 1 was replaced with polyester compound 9 in the preparation of an alumina dispersion in Example 1, an alumina dispersion was prepared by the same method as in Example 1.

Example 10: Preparation of Alumina Dispersion

With the exception that polyester compound 1 was replaced with polyester compound 10 in the preparation of an alumina dispersion in Example 1, an alumina dispersion was prepared by the same method as in Example 1.

Example 11: Preparation of Alumina Dispersion

To 100.0 weight parts of alumina powder (HIT-70 made by Sumitomo Chemical Co., Ltd.) were admixed 10.0 weight parts of polyester compound 1 and 867.0 weight parts of solvent in the form of a mixed solvent of a 1:1 (volume ratio) of methyl ethyl ketone and cyclohexanone and the mixture was dispersed for 5 hours in a paint shaker in the presence of zirconia beads 0.1 mm in diameter. Following dispersion, the mixture was filtered to separate the dispersion and the beads, yielding an alumina dispersion.

Example 12: Preparation of Alumina Dispersion

With the exception that polyester compound 1 was replaced with polyester compound 4 in the preparation of an alumina dispersion in Example 11, an alumina dispersion was prepared by the same method as in Example 11.

Example 13: Preparation of Alumina Dispersion

With the exception that the alumina powder was replaced with HIT-80 made by Sumitomo Chemical Co., Ltd. in the preparation of an alumina dispersion in Example 1, an alumina dispersion was prepared by the same method as in Example 1.

Example 14: Preparation of Alumina Dispersion

With the exception that polyester compound 1 was replaced with polyester compound 4 in the preparation of an alumina dispersion in Example 13, an alumina dispersion was prepared by the same method as in Example 13.

Example 15: Preparation of Alumina Dispersion

With the exception that polyester compound 1 was changed to 3.0 weight parts in the preparation of an alumina dispersion in Example 1, an alumina dispersion was prepared by the same method as in Example 1.

Example 16: Preparation of Alumina Dispersion

With the exception that polyester compound 1 was changed to 35.0 weight parts in the preparation of an alumina dispersion in Example 1, an alumina dispersion was prepared by the same method as in Example 1.

Example 17: Preparation of Alumina Dispersion

With the exception that polyester compound 1 was replaced with DISPERBYK-102 (a polyester compound containing phosphoric acid groups made by BYK Additives & Instruments) in the preparation of an alumina dispersion in Example 1, an alumina dispersion was prepared by the same method as in Example 1.

Example 18: Preparation of Alumina Dispersion

To 100.0 weight parts of alumina powder (HIT-70 made by Sumitomo Chemical Co., Ltd.) were admixed 10.0 weight parts of polyester compound 1, 33.3 weight parts of a 30% solution (solvent: cyclohexanone) of polyvinyl chloride copolymer (MR104 made by Zeon Corp.), and 835.0 weight parts of solvent in the form of a 1:1 (volume ratio) mixed solvent of methyl ethyl ketone and cyclohexanone. The mixture was then dispersed for 5 hours in a paint shaker in the presence of zirconia beads 0.1 mm in diameter. Following dispersion, the mixture was filtered to separate the dispersion and the beads, yielding an alumina dispersion.

Example 19: Preparation of Titanium Oxide Dispersion

With the exception that the alumina powder was replaced with titanium powder (STR-10LF made by Sakai Chemical Industry Co., Ltd.) in the preparation of alumina powder in Example 1, a titanium oxide dispersion was prepared by the same method as in Example 1.

Example 20: Preparation of Titanium Oxide Dispersion

With the exception that polyester compound 1 was changed to polyester compound 2 in the preparation of a titanium oxide dispersion in Example 19, a titanium oxide dispersion was prepared by the same method as in. Example 19.

Example 21: Preparation of Titanium Oxide Dispersion

With the exception that polyester compound 1 was changed to polyester compound 4 in the preparation of a titanium oxide dispersion in Example 19, a titanium oxide dispersion was prepared by the same method as in Example 19.

Example 22: Preparation of Titanium Oxide Dispersion

With the exception that polyester compound 1 was changed to polyester compound 5 in the preparation of a titanium oxide dispersion in Example 19, a titanium oxide dispersion was prepared by the same method as in Example 19.

Example 23: Preparation of Zinc Oxide Dispersion

With the exception that the alumina powder was changed to zinc oxide powder (FINEX-25-LPT made by Sakai Chemical Co., Ltd.) in the preparation of an alumina dispersion in Example 1, a zinc oxide dispersion was prepared by the same method as in Example 1.

Example 24: Preparation of Zinc Oxide Dispersion

With the exception that polyester compound 1 was changed to polyester compound 2 in the preparation of a titanium oxide dispersion in Example 23, a zinc oxide dispersion was prepared by the same method as in Example 23.

Example 25: Preparation of Zinc Oxide Dispersion

With the exception that polyester compound 1 was changed to polyester compound 4 in the preparation of a titanium oxide dispersion in Example 23, a zinc oxide dispersion was prepared by the same method as in Example 23.

Example 26: Preparation of Zinc Oxide Dispersion

With the exception that polyester compound 1 was changed to polyester compound 5 in the preparation of a titanium oxide dispersion in Example 23, a zinc oxide dispersion was prepared by the same method as in Example 23.

Example 27: Preparation of Zirconia Dispersion

With the exception that the alumina powder was changed to zirconia powder (TECNAPOW-ZRO2 made by TECNAN) in the preparation of an alumina dispersion in Example 1, a zirconia dispersion was prepared by the same method as in Example 1.

Example 28: Preparation of Zirconia Dispersion

With the exception that polyester compound 1 was changed to polyester compound 4 in the preparation of a zirconia dispersion in Example 27, a zirconia dispersion was prepared by the same method as in Example 27.

Comparative Example 1: Preparation of Alumina Dispersion

With the exception that polyester compound 1 was replaced with the 2,3-dihydroxynaphthalene used to prepare the alumina dispersion in the example of Japanese Unexamined Patent Publication (KOKAI) No. 2013-131285 in the preparation of an alumina dispersion in Example 1, an alumina dispersion was prepared by the same method as in Example 1.

2,3-dihydroxynaphthalene

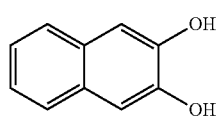

Comparative Example 2: Preparation of Alumina Dispersion

With the exception that polyester compound 1 was replaced with the 1,4-dihydroxynaphthalene used to prepare the alumina dispersion in the example of Japanese Unexamined Patent Publication (KOKAI) No. 2013-131285 in the preparation of an alumina dispersion in Example 1, an alumina dispersion was prepared by the same method as in Example 1.

1,4-dihydroxynaphthalene

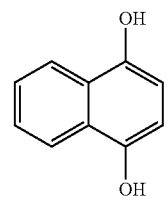 [SMILES: Oc1ccc(O)c2ccccc12]

Comparative Example 3: Preparation of Alumina Dispersion

With the exceptions that compound 1 was not added and 869.0 weight parts of a mixed solvent of 1:1 (volume ratio) methyl ethyl ketone and cyclohexanone were admixed in the preparation of an alumina dispersion in Example 1, an alumina dispersion was prepared by the same method as in Example 1.

Comparative Example 4: Preparation of Alumina Dispersion

With the exception that polyester compound 1 was replaced with the trans-cinnamic acid used to prepare the alumina dispersion in the comparative example of Japanese Unexamined Patent Publication (KOKAI) No. 2013-131285 in the preparation of an alumina dispersion in Example 1, an alumina dispersion was prepared by the same method as in Example 1.

Trans-Cinnamic Acid

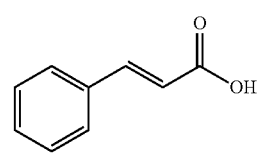 [SMILES: O=C(O)/C=C/c1ccccc1]

Comparative Example 5: Preparation of Alumina Dispersion

With the exception that polyester compound 1 was replaced with compound 11 in the preparation of an alumina dispersion in Example 1, an alumina dispersion was prepared by the same method as in Example 1.

<Evaluation Method: Evaluation of Dispersion by Dynamic Light Scattering>

The dispersion of the metal oxide particle dispersion obtained was evaluated based on the average particle diameter in solution as measured by dynamic light scattering. Each of the dispersions obtained was diluted with a 1:1 (volume ratio) mixed solution of methyl ethyl ketone and cyclohexanone to a 0.2 weight % solid component, ultrasonically dispersed for 1 minute, and cooled to room temperature. The measurement was then taken. A nanoparticle analyzer (SZ-100) made by Horiba was used for taking the measurements. The measurements were taken at a sample refractive index of 1.756 for alumina, 2.750 for titanium oxide, and 1.950 for zinc oxide; a dispersion medium refractive index of 1.409; and a dispersion medium viscosity of 1.050 mPa·s. The average particle size was calculated as the arithmetic average diameter.

For an average particle diameter of less than 75.0 nm, dispersion was evaluated as A and for greater than or equal to 75.0 nm, dispersion was evaluated as B.

[Examples of Manufacturing Particulate Magnetic Recording Media]

Examples 1 to 28, Comparative Examples 1 to 5

(Preparation of Magnetic Liquid)

For the following composition, a magnetic liquid was prepared by dispersing and mixing the various components until uniform, and then dispersing them for 15 hours in a sand mill.

| | |
|---|---|
| Hexagonal barium ferrite powder: | 100.0 parts |
| Composition excluding oxygen (molar ratio): | |
| Ba:Fe:Co:Zn = 1/9/0.2/1 | |
| Coercive force Hc: 176 kA/m A (2,200 Oe), average particle size | |
| (average plate diameter): 20 nm, average plate ratio: 3 | |
| Brunauer-Emmett-Teller (BET) specific surface area: 65 $m^2/g$ | |
| Saturation magnetization σs: 49 A · $m^2$/kg (49 emu/g) | |
| Oleic acid: | 1.5 parts |
| Polyester compound 1: | 10.0 parts |
| 30% solution (solvent: cyclohexanone) of polyvinyl chloride copolymer MR104 (made by Zeon Corp.): | 33.3 parts |
| 32% solution (solvent: 1:1 (weight ratio) mixed solvent of methyl ethyl ketone and toluene of polyester polyurethane resin (UR-4800 made by Toyobo) | 12.5 parts |
| Methyl ethyl ketone: | 31.0 parts |
| Cyclohexanone: | 31.0 parts |
| Carbon black (average particle diameter: 0.08 μm): | 0.5 part |

(Preparation of Magnetic Layer-Forming Composition)

The following components were added to the above magnetic liquid, and the mixture was stirred and mixed for another 20 minutes. The mixture was ultrasonically processed and filtered with a filter having an average pore diameter of 1 μm to prepare a magnetic layer-forming composition.

| | |
|---|---|
| Alumina dispersion prepared in Example 1: | 86.0 parts |
| Butyl stearate: | 1.5 parts |
| Stearic acid: | 0.5 part |
| Amide stearate: | 0.2 part |
| Methyl ethyl ketone: | 100.0 parts |
| Cyclohexanone: | 100.0 parts |
| Toluene: | 6 parts |
| Polyisocyanate compound (Coronate 3041 made by Nippon Polyurethane Industry Co, Ltd.): | 5.0 parts |

(Preparation of Nonmagnetic Layer-Forming Composition)

| | |
|---|---|
| Carbon black: | 100.0 parts |
| Dibutyl phthalate (DBP) absorption capacity: 100 mL/100 g pH:8 | |
| 32% solution (solvent: 1:1 (weight ratio) mixed solvent of methyl ethyl ketone and toluene) of polyester polyurethane resin (UR-4800 made by Toyobo): | 62.5 parts |
| 30% solution (solvent: cyclohexanone) of polyvinyl chloride copolymer MR104 (made by Zeon Corp.): | 100.0 parts |
| Trioctylamine: | 4.0 parts |
| Cyclohexanone: | 70.0 parts |
| Methyl ethyl ketone: | 130.0 parts |
| Butyl stearate: | 2.0 parts |
| Stearic acid: | 2.0 parts |
| Amide stearate: | 0.1 part |

The various components of the above composition were kneaded in an open kneader and then dispersed in a sand mill. The following components were added to the dispersion obtained and the mixture was stirred. The mixture was filtered with a filter having an average pore diameter of 1 μm to prepare a nonmagnetic layer-forming composition.

| | |
|---|---|
| Butyl stearate: | 1.5 parts |
| Stearic acid: | 1.0 part |
| Methyl ethyl ketone: | 50.0 parts |
| Cyclohexanone: | 50.0 parts |
| Toluene: | 3.0 parts |
| Polyisocyanate compound (Coronate 3041 made by Nippon Polyurethane Industry Co., Ltd.): | 5.0 parts |

(Preparation of Backcoat Layer-Forming Composition)

| | |
|---|---|
| Carbon black (average particle size: 40 nm): | 85.0 parts |
| Carbon black (average particle size: 100 nm): | 3.0 parts |
| Nitrocellulose: | 28 parts |
| 32% solution (solvent: 1:1 (weight ratio) mixed solvent of methyl ethyl ketone and toluene) of polyester polyurethane resin (UR-4800 made by Toyobo): | 181.0 parts |
| Copper phthalocyanine dispersing agent: | 2.5 parts |
| Nipporan 2301 (made by Nippon Polyurethane Industry Co., Ltd.): | 0.5 part |
| Methyl isobutyl ketone: | 0.3 part |
| Methyl ethyl ketone: | 800.0 parts |
| Toluene: | 180.0 parts |

The above components were prekneaded in a roll mill and then dispersed in a sand mill. To the dispersion were added 4 parts of polyester resin (Vylon 500 made by Toyobo), 14 parts of polyisocyanate compound (Coronate 3041 made by Nippon Polyurethane Industry Co., Ltd.), and 5 parts of alumina powder (HIT-70 made by Sumitomo Chemical Co., Ltd.). The mixture was stirred and filtered to prepare a backcoat layer-forming composition.

(Preparation of Magnetic Tape)

Both surfaces of a polyethylene naphthalate support (5.0 μm in thickness) were corona discharge treated.

Simultaneous multilayer coating was conducted by coating the above nonmagnetic layer-forming composition in a quantity calculated to yield a thickness of 1.0 μm upon drying on one surface of the above polyethylene naphthalate support and immediately thereafter forming a magnetic layer thereover to a thickness of 100 nm. While the two layers were still wet, an orientation treatment was conducted with a solenoid having a magnetic force of 0.4 T (4,000 G) and a cobalt magnetic having a magnetic force of 0.5 T (5,000 G), after which the layers were dried.

Subsequently, the backcoat layer-forming composition was coated in a quantity calculated to yield a thickness of 0.5 μm on the other surface of the polyethylene naphthalate support. Treatment was then conducted with a seven-stage calender comprised of metal rolls at a temperature of 100°

C. at a rate of 80 m/min. The product was slit to ½ inch (0.0127 meter) width to fabricate a magnetic tape.

Comparative Example 6

With the exception that the magnetic layer-forming composition prepared by the method set forth below was employed, a magnetic tape was fabricated by the same method as above.

(Preparation of Magnetic Liquid)

The various components of the composition set forth below were dispersed and mixed until uniform. A sand mill was then used to conduct dispersion for 15 hours to prepare a magnetic liquid.

| | |
|---|---|
| Hexagonal barium ferrite powder: | 100.0 parts |
| Composition excluding oxygen (molar ratio): Ba:Fe:Co:Zn = 1/9/0.2/1 | |
| Coercive force Hc: 176 kA/m (2,200 Oe) | |
| Average particle size (average plate diameter): 20 nm | |
| Average plate ratio: 3 | |
| BET specific surface area: 65 m$^2$/g | |
| Saturation magnetization σs: 49 A · m$^2$/kg (49 emu/g) | |
| Oleic acid: | 1.5 parts |
| Polyester compound 1: | 10.0 parts |
| 30% solution (solvent: cyclohexanone) of polyvinyl chloride copolymer MR 104 (made by Zeon Corp.): | 33.3 parts |
| 32% solution (solvent: mixed solvent of methyl ethyl ketone and toluene) of polyester polyurethane resin (UR-4800 made by Toyobo): | 12.5 parts |
| Methyl ethyl ketone: | 31.0 parts |
| Cyclohexanone: | 31.0 parts |
| Alumina powder (HIT-70 made by Sumitomo Chemical Co., Ltd.): | 15.0 parts |
| Carbon black (average particle diameter: 0.08 μm): | 0.5 part |

(Preparation of Magnetic Layer-Forming Composition)

The following components were added to the above magnetic liquid and the mixture was stirred and mixed for another 20 minutes. The mixture was then ultrasonically treated and filtered with a filter having an average pore diameter of 1 μm to prepare a magnetic layer-forming composition.

| | |
|---|---|
| Butyl stearate: | 1.5 parts |
| Stearic acid: | 0.5 part |
| Amide stearate: | 0.2 part |
| Methyl ethyl ketone: | 100.0 parts |
| Cyclohexanone: | 100.0 parts |
| Toluene: | 6.0 parts |
| Polyisocyanate compound (Coronate 3041 made by Nippon Polyurethane Industry Co., Ltd.): | 5.0 parts |

The average particle size of the above commercial nonmagnetic particles is given in Table 2.

TABLE 2

| Type | Product name | Average particle size |
|---|---|---|
| Alumina | HIT-70 made by Sumitomo Chemical Co., Ltd. | 140 nm |
| Alumina | HIT-80 made by Sumitomo Chemical Co., Ltd. | 100 nm |

TABLE 2-continued

| Type | Product name | Average particle size |
|---|---|---|
| Titanium oxide | STR-10LF made by Sakai Chemical Industry Co., Ltd. | 40 nm |
| Zinc oxide | FINEX-25-LPT made by Sakai Chemical Industry Co., Ltd. | 60 nm |
| Zirconia | TECNAPOW-ZRO2 made by TECNAN | 15 nm |

<Evaluation Method: Centerline Average Surface Roughness of Magnetic Layer>

The centerline average surface roughness (Ra) was measured for a 40 μm×40 μm area of the surface of the magnetic layer in tapping mode with an atomic force microscope (AFM: Nanoscope III made by Digital Instruments Corp.).

<Evaluation Method: Change in Surface Roughness>

The surface of the magnetic layer of a magnetic tape was slid back and forth 100 times with a load of 100 g at a rate of 10 mm/sec over a cylindrical SUS (stainless steel) rod with a centerline average surface roughness Ra as measured by AFM of 5 nm, after which the centerline average surface roughness (Ra) was measured in the same manner as set forth above. When the coefficient of friction became excessively high during running and thus the cylindrical SUS rod ended up adhering to the surface of the magnetic layer, the centerline average surface roughness (Ra) was measured at the point in time when adhesion occurred.

A difference in the Ra before and after sliding (Ra prior to sliding−Ra after sliding) of less than 0.1 nm was evaluated as A and greater than or equal to 0.1 nm as B.

<Evaluation Methods: Change in Coefficient of Friction>

A magnetic tape, with the surface of the magnetic layer to the inside, was wound at an overall magnetic tape winding angle of 170° C. on a cylindrical SUS rod with a centerline average surface roughness Ra as measured by AFM of 5 nm, a 100 g load was applied to one end of the magnetic tape, and a force gage was mounted on the other end. While in this state, the coefficient of friction (μ value) when slid back and forth once at a rate of 10 mm/sec was measured, and the difference in the coefficient of friction (μ value) when slid repeatedly back and forth 100 times (μ value when slid back and force 100 times−μ value when slid back and forth once) was determined.

The coefficient of friction was calculated from the following equation as the force measured by F2=force gauge at a load F1=100 g.

$$\mu = \ln(F2/F1)(1/\theta) \quad \theta: \text{Winding angle in radians}$$

A difference in coefficient of friction before and after sliding of less than 0.1 was evaluated as A and of greater than or equal to 0.1 as B. The case when the coefficient of friction became excessively high and thus the cylindrical SUS rod ended up adhering to the surface of the magnetic layer was evaluated as C.

The results of the above are given in Table 3.

TABLE 3

| | | Metal oxide particle dispersion | | | Evaluation results | | | |
|---|---|---|---|---|---|---|---|---|
| | Metal oxide particles | Product name | Compound employed for the preparation of metal oxide particle dispersion | Presence or absence of binder in the metal oxide particle dispersion | Particle diameter by dynamic light scattering (nm) | Dispersion of metal oxide particle dispersion | Change in centerline average surface roughness, Ra | Change in coefficient of friction, μ value |
| Examples 1 | Alumina | HIT-70 | Polyester compound 1 | Contained | 66.3 | A | A | A |
| 2 | Alumina | HIT-70 | Polyester compound 2 | Contained | 67.6 | A | A | A |
| 3 | Alumina | HIT-70 | Polyester compound 3 | Contained | 69.6 | A | A | A |
| 4 | Alumina | HIT-70 | Polyester compound 4 | Contained | 72.6 | A | A | A |
| 5 | Alumina | HIT-70 | Polyester compound 5 | Contained | 72.2 | A | A | A |
| 6 | Alumina | HIT-70 | Polyester compound 6 | Contained | 72.2 | A | A | A |
| 7 | Alumina | HIT-70 | Polyester compound 7 | Contained | 68.9 | A | A | A |
| 8 | Alumina | HIT-70 | Polyester compound 8 | Contained | 65.8 | A | A | A |
| 9 | Alumina | HIT-70 | Polyester compound 9 | Contained | 69.6 | A | A | A |
| 10 | Alumina | HIT-70 | Polyester compound 10 | Contained | 67.9 | A | A | A |
| 11 | Alumina | HIT-70 | Polyester compound 1 | None | 63.6 | A | A | A |
| 12 | Alumina | HIT-70 | Polyester compound 4 | None | 65.7 | A | A | A |
| 13 | Alumina | HIT-80 | Polyester compound 1 | Contained | 53.7 | A | A | A |
| 14 | Alumina | HIT-80 | Polyester compound 4 | Contained | 60.1 | A | A | A |
| 15 | Alumina | HIT-70 | Polyester compound 1 | Contained | 66.1 | A | A | A |
| 16 | Alumina | HIT-70 | Polyester compound 1 | Contained | 71.6 | A | A | A |
| 17 | Alumina | HIT-70 | DISPERBYK-102 | Contained | 73.8 | A | A | A |
| 18 | Alumina | HIT-70 | Polyester compound 1 | Contained | 69.8 | A | A | A |
| 19 | Titanium oxide | STR-10LF | Polyester compound 1 | Contained | 72.2 | A | A | A |
| 20 | Titanium oxide | STR-10LF | Polyester compound 2 | Contained | 74.8 | A | A | A |
| 21 | Titanium oxide | STR-10LF | Polyester compound 4 | Contained | 72.7 | A | A | A |
| 22 | Titanium oxide | STR-10LF | Polyester compound 5 | Contained | 70.7 | A | A | A |
| 23 | Zinc oxide | FINEX-25-LPT | Polyester compound 1 | Contained | 72.1 | A | A | A |
| 24 | Zinc oxide | FINEX-25-LPT | Polyester compound 2 | Contained | 71.6 | A | A | A |
| 25 | Zinc oxide | FINEX-25-LPT | Polyester compound 4 | Contained | 73.4 | A | A | A |
| 26 | Zinc oxide | FINEX-25-LPT | Polyester compound 5 | Contained | 74.6 | A | A | A |
| 27 | Zirconia | TECNAPOW-ZRO2 | Polyester compound 1 | Contained | 52.8 | A | A | A |
| 28 | Zirconia | TECNAPOW-ZRO2 | Polyester compound 4 | Contained | 54.9 | A | A | A |
| Comp. Ex. 1 | Alumina | HIT-70 | 2,3-dihydroxynaphthalene | Contained | 75.1 | B | B | A |
| 2 | Alumina | HIT-70 | 1,4-dihydroxynaphthalene | Contained | 75.4 | B | B | B |
| 3 | Alumina | HIT-70 | None | Contained | 75.3 | B | B | C |
| 4 | Alumina | HIT-70 | trans-cinnamic acid | Contained | 76.5 | B | B | C |
| 5 | Alumina | HIT-70 | Compound 11 | Contained | 80.1 | B | B | B |
| 6 | Alumina | HIT-70 | Polyester compound 1 | — | — | — | A | B |

As indicated in Table 3, all of the evaluated items in Examples received evaluations of A. Based on the results indicated in Table 3, the magnetic recording media of Examples, which had magnetic layers formed with a magnetic layer-forming composition prepared by mixing a magnetic liquid and a dispersion in the form of one of the magnetic oxide particle dispersions of Examples in which the magnetic oxide particles were well dispersed, were confirmed to inhibit change (change in surface roughness and change in coefficient of friction) in the surface state of the magnetic layer with repeated running.

An aspect of the present invention an be useful in the technical field of magnetic recording media for data storage that are repeatedly used for extended periods, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A metal oxide particle dispersion,
   which is a metal oxide particle dispersion for manufacturing a particulate magnetic recording medium, and comprises:
   metal oxide particles,
   solvent, and
   a polyester compound comprising a polyester compound denoted by formula (1) below, but substantially not comprising ferromagnetic powder,
   wherein the solid component concentration ranges from 5 to 20 wt %:

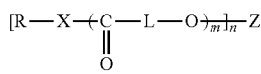

Formula (1)

wherein, in formula (1), X denotes —O—, —S—, or —NR$^{100}$—, each of R and R$^{100}$ independently denotes a hydrogen atom or a monovalent substituent, L denotes a divalent linking group, Z denotes a partial structure of valance n comprising at least one group selected from the group consisting of a carboxyl group and a salt thereof, m denotes an integer of greater than or equal to 2, and n denotes an integer of greater than or equal to 1.

2. The metal oxide particle dispersion according to claim 1,
wherein the weight average molecular weight of the polyester compound is greater than or equal to 1,000 but less than or equal to 20,000.

3. The metal oxide particle dispersion according to claim 2,
wherein the weight average molecular weight of the polyester compound is greater than or equal to 1,000 but less than or equal to 10,000.

4. The metal oxide particle dispersion according to claim 1,
wherein the metal oxide particles are at least one type of metal oxide particles selected from the group consisting of alumina particles, titanium oxide particles, zinc oxide particles and zirconia particles.

5. The metal oxide particle dispersion according to claim 1,
wherein the average particle size of the metal oxide particles ranges from 25 nm to 200 nm.

6. The metal oxide particle dispersion according to claim 1,
wherein the solvent comprises organic solvent.

7. The metal oxide particle dispersion according to claim 6,
wherein the organic solvent comprises ketone solvent.

8. The metal oxide particle dispersion according to claim 1,
further comprising a binder.

9. The metal oxide particle dispersion according to claim 8,
wherein the binder comprises at least one resin selected from the group consisting of polyurethane resin and vinyl chloride resin.

10. The metal oxide particle dispersion according to claim 1,
which is employed in preparation of a magnetic layer-forming composition of a particulate magnetic recording medium.

11. The metal oxide particle dispersion according to claim 1,
which comprises 1.0 to 50.0 weight parts of the polyester compound per 100.0 weight parts of the metal oxide particles.

12. A method of manufacturing a magnetic layer-forming composition of a particulate magnetic recording medium,
which comprises mixing a metal oxide particle dispersion for manufacturing a particulate magnetic recording medium with ferromagnetic powder,
the metal oxide particle dispersion comprises:
metal oxide particles;
a solvent; and
a polyester compound comprising a polyester compound denoted by formula (1) below, but substantially not comprising ferromagnetic powder,
wherein the solid component concentration in the metal oxide particle dispersion ranges from 5 to 20 wt %:

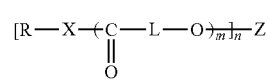

Formula (1)

wherein, in formula (1), X denotes —O—, —S—, or —NR$^{100}$—, each of R and R$^{100}$ independently denotes a hydrogen atom or a monovalent substituent, L denotes a divalent linking group, Z denotes a partial structure of valance n comprising at least one group selected from the group consisting of a carboxyl group and a salt thereof, m denotes an integer of greater than or equal to 2, and n denotes an integer of greater than or equal to 1.

13. The method of manufacturing a magnetic layer-forming composition of a particulate magnetic recording medium according to claim 12,
wherein the mixing is conducted by mixing the metal oxide particle dispersion with a magnetic liquid comprising the ferromagnetic powder, solvent, and binder.

14. A method of manufacturing a particulate magnetic recording medium,
which comprises manufacturing a magnetic layer-forming composition by a method comprising mixing a metal oxide particle dispersion for manufacturing a particulate magnetic recording medium with ferromagnetic powder, the metal oxide particle dispersion comprising:
metal oxide particles;
solvent; and
a polyester compound comprising a polyester compound denoted by formula (1) below, but substantially not comprising ferromagnetic powder; and
forming a magnetic layer through coating the magnetic layer-forming composition that has been manufactured on a nonmagnetic support,
wherein the solid component concentration in the metal oxide particle dispersion ranges from 5 to 20 wt %:

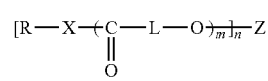

Formula (1)

wherein, in formula (1), X denotes —O—, —S—, or —NR$^{100}$—, each of R and R$^{100}$ independently denotes a hydrogen atom or a monovalent substituent, L denotes a divalent linking group, Z denotes a partial structure of valance n comprising at least one group selected from the group consisting of a carboxyl group and a salt thereof, m denotes an integer of greater than or equal to 2, and n denotes an integer of greater than or equal to 1.

15. The method of manufacturing a particulate magnetic recording medium according to claim 14,
wherein the mixing is conducted by mixing the metal oxide particle dispersion with a magnetic liquid comprising the ferromagnetic powder, solvent, and binder.

16. The metal oxide particle dispersion according to claim 1, wherein Z in formula (1) denotes a reactive residue of a carboxylic anhydride.

* * * * *